(12) United States Patent
Maruyama et al.

(10) Patent No.: US 12,474,479 B2
(45) Date of Patent: Nov. 18, 2025

(54) LIGHT RECEIVING ELEMENT AND DISTANCE MEASURING DEVICE

(71) Applicant: SONY SEMICONDUCTOR SOLUTIONS CORPORATION, Kanagawa (JP)

(72) Inventors: Takuya Maruyama, Kanagawa (JP); Yusuke Otake, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 768 days.

(21) Appl. No.: 17/755,980

(22) PCT Filed: Oct. 8, 2020

(86) PCT No.: PCT/JP2020/038145
§ 371 (c)(1),
(2) Date: May 13, 2022

(87) PCT Pub. No.: WO2021/100351
PCT Pub. Date: May 27, 2021

(65) Prior Publication Data
US 2022/0390611 A1  Dec. 8, 2022

(30) Foreign Application Priority Data

Nov. 21, 2019  (JP) ................ 2019-210098

(51) Int. Cl.
*G01S 17/931* (2020.01)
*G01S 7/4863* (2020.01)
(Continued)

(52) U.S. Cl.
CPC .......... *G01S 17/931* (2020.01); *G01S 7/4863* (2013.01); *G01S 17/08* (2013.01); *G01S 17/89* (2013.01); *H10F 39/811* (2025.01)

(58) Field of Classification Search
CPC ...... G01S 17/931; G01S 7/4863; G01S 17/08; G01S 17/89; G01S 7/4914; G01S 7/4915;
(Continued)

(56) References Cited

U.S. PATENT DOCUMENTS 8,785,831 B2 * 7/2014 Krymski ............. H04N 25/771
                                                         250/214 R
2014/0319321 A1  10/2014 Wada et al.
(Continued)

FOREIGN PATENT DOCUMENTS

CN      111955003 A      11/2020
JP      2007-060500 A     3/2007
(Continued)

OTHER PUBLICATIONS

International Search Report and Written Opinion of PCT Application No. PCT/JP2020/038145, issued on Dec. 15, 2020, 13 pages of ISRWO.

*Primary Examiner* — Tony Ko
(74) *Attorney, Agent, or Firm* — CHIP LAW GROUP

(57) ABSTRACT

Provided is a light receiving element capable of lowering the on-voltage of a transfer transistor and suppressing transfer failures at a low on-voltage. The light receiving element includes a plurality of pixels arranged in a matrix, each of the plurality of pixels including: a photoelectric conversion unit; first and second charge storage units that store charges generated by the photoelectric conversion unit; first and second transfer transistors that transfer the charges from the photoelectric conversion unit to the first and second charge storage units, respectively; first and second amplification transistors that amplify potentials of the first and second charge storage units, respectively; and a connection wiring that electrically connects the first charge storage unit and the first amplification transistor, wherein a first transfer control wiring electrically connected to a gate of the first transfer (Continued)

transistor of each of the pixels in the same row extends in a row direction in a first wiring layer, and the connection wiring extends to the first wiring layer.

18 Claims, 31 Drawing Sheets

(51) Int. Cl.
*G01S 17/08* (2006.01)
*G01S 17/89* (2020.01)
*H10F 39/00* (2025.01)

(58) Field of Classification Search
CPC ...... G01S 17/894; G01S 17/36; H10F 39/811; H10F 39/12; H04N 25/76
See application file for complete search history.

(56) References Cited

U.S. PATENT DOCUMENTS

| | | | |
|---|---|---|---|
| 2015/0130902 A1 | 5/2015 | Fossum et al. | |
| 2019/0020835 A1* | 1/2019 | Takahashi | H10F 39/807 |

FOREIGN PATENT DOCUMENTS

| | | |
|---|---|---|
| JP | 2009-008537 A | 1/2009 |
| JP | 2014-216537 A | 11/2014 |
| JP | 2015-186171 A | 10/2015 |
| JP | 2016-092593 A | 5/2016 |
| KR | 10-2015-0053673 A | 5/2015 |
| TW | 202005361 A | 1/2020 |
| WO | 2019/198586 A1 | 10/2019 |

* cited by examiner

LIGHT RECEIVING ELEMENT AND DISTANCE MEASURING DEVICE

CROSS REFERENCE TO RELATED APPLICATIONS

This application is a U.S. National Phase of International Patent Application No. PCT/JP2020/038145 filed on Oct. 8, 2020, which claims priority benefit of Japanese Patent Application No. JP 2019-210098 filed in the Japan Patent Office on Nov. 21, 2019. Each of the above-referenced applications is hereby incorporated herein by reference in its entirety.

TECHNICAL FIELD

The technology (the present technology) according to the present disclosure relates to a light receiving element and a distance measuring device using the light receiving element.

BACKGROUND ART

As a Time of Flight (ToF) method that measures the distance based on the light flight time, a direct ToF method that measures the distance from the light flight time that is directly measured using a pulse wave and an indirect ToF method that measures the distance from the light flight time that is indirectly calculated using the phase of modulated light are known.

Of these, in the indirect ToF method, light is irradiated from a light source, and the light reflected by an object is photoelectrically converted by a photoelectric conversion unit. The charges generated by the photoelectric conversion unit are distributed to a plurality of charge storage units by a plurality of transfer transistors. Then, the distance to the object is calculated based on a phase signal corresponding to the amount of charges stored in the plurality of charge storage units (see PTL 1).

CITATION LIST

Patent Literature

[PTL 1]
JP 2009-8537 A

SUMMARY

Technical Problem

In the indirect ToF method as described in PTL 1, in order to raise the driving frequency and improve the distance measurement accuracy, it is effective to reduce the on-voltage of the transfer transistor to reduce the voltage amplitude. However, the decrease in the on-voltage of the transfer transistor has a trade-off relationship with transfer failures.

An object of the present technology is to provide a light receiving element and a distance measuring device capable of lowering the on-voltage of a transfer transistor and suppressing transfer failures at a low on-voltage.

Solution to Problem

A light receiving element according to one aspect of the present technology includes a plurality of pixels arranged in a matrix, each of the plurality of pixels including: a photoelectric conversion unit; first and second charge storage units that store charges generated by the photoelectric conversion unit; first and second transfer transistors that transfer the charges from the photoelectric conversion unit to the first and second charge storage units, respectively; first and second amplification transistors that amplify potentials of the first and second charge storage units, respectively; and a connection wiring that electrically connects the first charge storage unit and the first amplification transistor, wherein a first transfer control wiring electrically connected to a gate of the first transfer transistor of each of the pixels in the same row extends in a row direction in a first wiring layer, and the connection wiring extends to the first wiring layer.

A light receiving element according to another aspect of the present technology includes a plurality of pixels arranged in a matrix, each of the plurality of pixels including: a photoelectric conversion unit; first and second charge storage units that store charges generated by the photoelectric conversion unit; first and second transfer transistors that transfer the charges from the photoelectric conversion unit to the first and second charge storage units, respectively; first and second amplification transistors that amplify potentials of the first and second charge storage units, respectively; a connection wiring that electrically connects the first charge storage unit and the first amplification transistor; and a discharge transistor that discharges the charges of the photoelectric conversion unit, wherein a discharge control wiring electrically connected to a gate of the discharge transistor of each of the pixels in the same row extends in a row direction in the first wiring layer, and the connection wiring extends to the first wiring layer.

A light receiving element according to another aspect of the present technology includes a plurality of pixels arranged in a matrix, each of the plurality of pixels including: a photoelectric conversion unit; first and second charge storage units that store charges generated by the photoelectric conversion unit; first and second transfer transistors that transfer the charges from the photoelectric conversion unit to the first and second charge storage units, respectively; first and second amplification transistors that amplify potentials of the first and second charge storage units, respectively; a connection wiring that electrically connects the first charge storage unit and the first amplification transistor; and a reset transistor that resets the charges of the first charge storage unit, wherein a reset control wiring connected to a gate of the reset transistor of each of the pixels in the same row extends in a row direction in the first wiring layer, and the connection wiring extends to the first wiring layer.

A light receiving element according to another aspect of the present technology includes a plurality of pixels arranged in a matrix, each of the plurality of pixels including: a photoelectric conversion unit; first and second charge storage units that store charges generated by the photoelectric conversion unit; first and second transfer transistors that transfer the charges from the photoelectric conversion unit to the first and second charge storage units, respectively; first and second amplification transistors that amplify potentials of the first and second charge storage units, respectively; a connection wiring that electrically connects the first charge storage unit and the first amplification transistor; and a reset transistor that resets the charges in the first charge storage unit, wherein a boost wiring for boosting the first charge storage unit while the charges are being stored in the first and second charge storage units extends in a row direction in the first wiring layer, and the connection wiring extends to the first wiring layer.

A distance measuring device according to one aspect of the present technology a light emitting unit that emits light; a light receiving unit having a plurality of pixels arranged in a matrix to receive reflected light reflected by an object; and a calculation unit that calculates the distance to the object based on the detection signal from the light receiving unit, and each of the plurality of pixels including: a photoelectric conversion unit; first and second charge storage units that store charges generated by the photoelectric conversion unit; first and second transfer transistors that transfer the charges from the photoelectric conversion unit to the first and second charge storage units, respectively; first and second amplification transistors that amplify potentials of the first and second charge storage units, respectively; and a connection wiring that electrically connects the first charge storage unit and the first amplification transistor, wherein a first transfer control wiring electrically connected to a gate of the first transfer transistor of each of the pixels in the same row extends in a row direction in a first wiring layer, and the connection wiring extends to the first wiring layer.

DESCRIPTION OF EMBODIMENTS

Hereinafter, first to tenth embodiments of the present technology will be described with reference to drawings. In the descriptions of the drawings to be referred to hereinafter, the same or similar portions are denoted by the same or similar reference signs. However, it should be noted that the figures are schematic and relationships between thicknesses and planar dimensions, ratios of thicknesses of respective layers, and the like are different from actual ones. Therefore, specific thicknesses and dimensions should be determined by taking the following description into consideration. In addition, it is needless to say that portions having different dimensional relationships and ratios between the figures are included in the figures.

The advantageous effects described in the present specification are merely exemplary and are not restrictive, and other advantageous effects may be produced.

First Embodiment

<Configuration of Distance Measuring Device>

Figure 1:
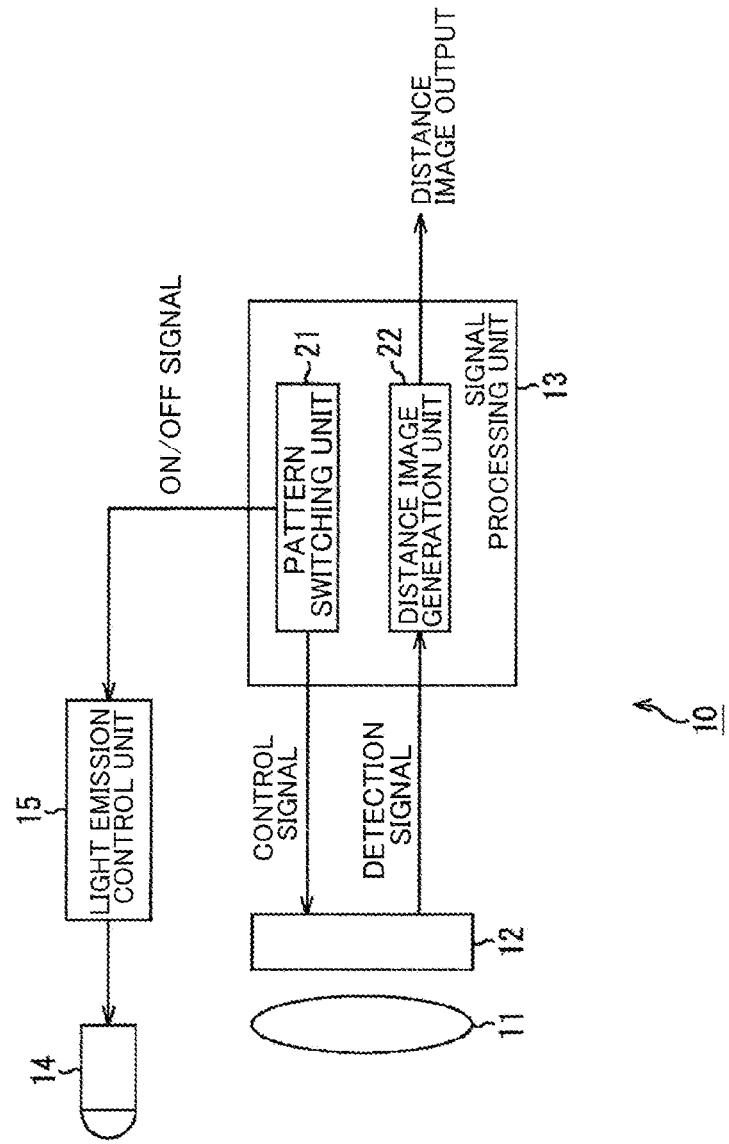
FIG. 1 is a schematic diagram of a distance measuring device according to a first embodiment.

As shown in FIG. 1, a distance measuring device 10 according to the first embodiment of the present technology includes a lens 11, a light receiving unit (light receiving element) 12, a signal processing unit 13, a light emitting unit 14, and a light emission control unit 15.

The light emitting unit 14 may be arranged inside the housing of the distance measuring device 10, or may be arranged outside the housing of the distance measuring device 10. The light emitting unit 14 emits light such as infrared light (IR). An IR bandpass filter may be provided between the lens 11 and the light receiving unit 12, and the light emitting unit 14 may emit infrared light corresponding to the transmission wavelength band of the IR bandpass filter. The light emission control unit 15 controls the light emission of the light emitting unit 14 according to a control signal (on/off signal) from the signal processing unit 13.

The light receiving unit 12 is constituted by, for example, a Complementary Metal Oxide Semiconductor (CMOS) image sensor. The light receiving unit 12 receives the reflected light reflected by an object from the light emitting unit 14 via the lens 11. The light receiving unit 12 outputs a pixel signal (detection signal) corresponding to the amount of received light to the signal processing unit 13.

The signal processing unit 13 includes a pattern switching unit 21 and a distance image generation unit (calculation unit) 22. The pattern switching unit 21 outputs a control signal (on/off signal) for switching the light emission pattern of the light emitting unit 14 to the light emission control unit 15 at a predetermined timing. For example, the pattern switching unit 21 may switch the light emission pattern of the light emitting unit 14 so as not to overlap the light emission pattern of another distance measuring device. The signal processing unit 13 may not include the pattern switching unit 21.

The distance image generation unit 22 calculates the distance from the distance measuring device 10 to the object based on the detection signal from the light receiving unit 12. The distance image generation unit 22 generates a distance image based on the calculated distance, and outputs the generated distance image to the outside.

<Configuration of Light Receiving Unit>

Figure 2:
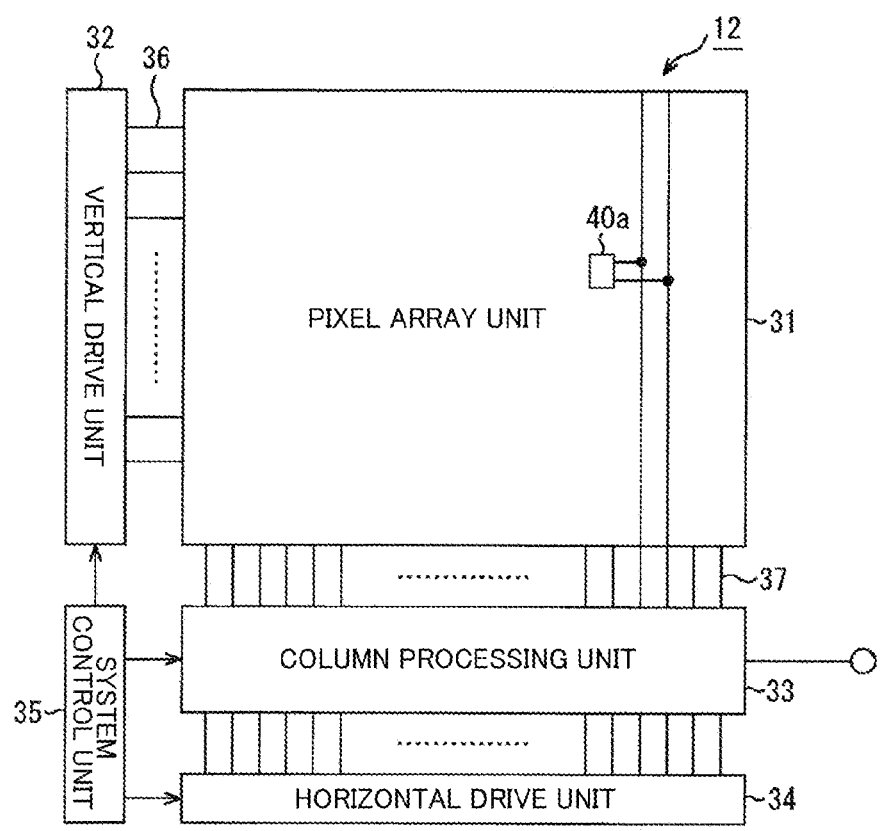
FIG. 2 is a schematic diagram of a light receiving unit according to the first embodiment.

As shown in FIG. 2, the light receiving unit 12 includes a pixel array unit 31, a vertical drive unit 32, a column processing unit 33, a horizontal drive unit 34, and a system control unit 35. The pixel array unit 31, the vertical drive unit 32, the column processing unit 33, the horizontal drive unit 34, and the system control unit 35 are provided on a semiconductor substrate (semiconductor chip) (not shown).

The pixel array unit 31 includes a plurality of pixels (unit pixels) arranged in a two-dimensional matrix. FIG. 2 illustrates one pixel 40a among a plurality of pixels. The pixel 40a has a photoelectric conversion element that photoelectrically converts the received light and generates charges corresponding to the amount of light.

A vertical drive unit 32 is connected to the pixel array unit 31 via a pixel drive line 36. The vertical drive unit 32 is constituted by a shift register and an address decoder. The vertical drive unit 32 drives each pixel in the pixel array unit 31, simultaneously, in units of rows, or the like. A pixel signal output from each pixel in the pixel row selectively scanned by the vertical drive unit 32 is supplied to the column processing unit 33 through each of the vertical signal lines 37.

The column processing unit 33 performs, for each pixel column of the pixel array unit 31, predetermined signal processing on the pixel signal output from each unit pixel in a selected row through the vertical signal line 37. For example, the column processing unit 33 removes pixel-specific fixed pattern noise such as reset noise and threshold variation of the amplification transistor by performing noise reduction processing such as correlated double sampling (CDS) processing as signal processing. The column processing unit 33 may perform analog-to-digital (AD) conversion of a pixel signal which is an analog signal.

The horizontal drive unit 34 is constituted by a shift register and an address decoder. The horizontal drive unit 34 selects unit circuits, which correspond to the pixel columns of the column processing unit 33, in order. By the selection and scanning performed by the horizontal drive unit 34, pixel signals processed by the column processing unit 33 are sequentially output to the signal processing unit 13.

The system control unit 35 is constituted by a timing generator that generates various timing signals. The system control unit 35 controls the driving of the vertical drive unit 32, the column processing unit 33, the horizontal drive unit 34, and the like on the basis of the various timing signals generated by the timing generator.

<Equivalent Circuit of Pixel>

Figure 3:
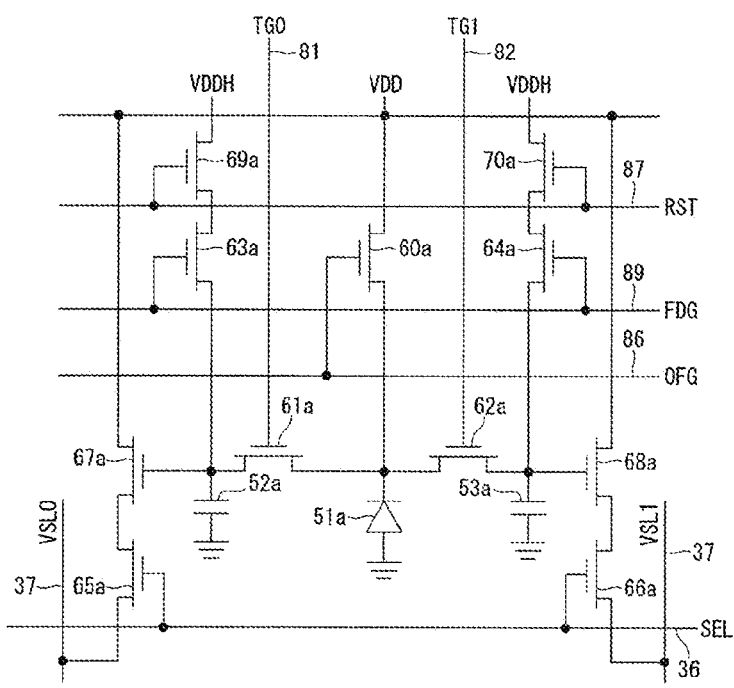
FIG. 3 is an equivalent circuit diagram of pixels according to the first embodiment.

FIG. 3 shows an equivalent circuit of the pixel 40a. The pixel 40a includes a photodiode 51a, a discharge transistor 60a, transfer transistors 61a and 62a, conversion efficiency adjustment transistors 63a and 64a, selection transistors 65a and 66a, amplification transistors 67a and 68a, and reset transistors 69a and 70a. The discharge transistor 60a, the transfer transistors 61a and 62a, the conversion efficiency adjustment transistors 63a and 64a, the selection transistors 65a and 66a, the amplification transistors 67a and 68a, and the reset transistors 69a and 70a are constituted by, for example, a MOS transistor.

The photodiode 51a constitutes a photoelectric conversion unit that photoelectrically converts incident light. The anode of the photodiode 51a is grounded. The source of the transfer transistors 61a and 62a and the source of the discharge transistor 60a are connected to the cathode of the photodiode 51a.

The power supply potential VDD is applied to the drain of the discharge transistor 60a. A discharge signal OFG is applied to the gate of the discharge transistor 60a via the discharge control wiring 86. The discharge transistor 60a discharges the charges of the photodiode 51a based on the discharge signal OFG. It should be noted that the discharge transistor 60a may be omitted.

The drains of the transfer transistors 61a and 62a are connected to the charge storage units 52a and 53a, respectively, which are constituted by a floating diffusion region (floating diffusion). Transfer control signals TG0 and TG1 are applied to the gates of the transfer transistors 61a and 62a via the transfer control wirings 81 and 82, respectively. The transfer transistors 61a and 62a transfer the charges from the photodiode 51a to the charge storage units 52a and 53a, respectively, based on the transfer control signals TG0 and TG1.

The charge storage units 52a and 53a store the charges transferred from the photodiode 51a via the transfer transistors 61a and 62a. The potentials of the charge storage units 52a and 53a are modulated according to the amounts of charges stored in the charge storage units 52a and 53a, respectively.

The sources of the conversion efficiency adjustment transistors 63a and 64a are connected to the charge storage units 52a and 53a, respectively. The drains of the conversion efficiency adjustment transistors 63a and 64a are connected to the sources of the reset transistors 69a and 70a, respectively. A common conversion efficiency adjustment signal FDG is applied to the gates of the conversion efficiency adjustment transistors 63a and 64a via the conversion efficiency adjustment wiring 89. The conversion efficiency adjustment transistors 63a and 64a adjust the charge conversion efficiency according to the conversion efficiency adjustment signal FDG. The conversion efficiency adjustment transistors 63a and 64a may be omitted. In that case, the sources of the reset transistors 69a and 70a are connected to the charge storage units 52a and 53a, respectively.

The power supply potential VDDH is applied to the drains of the reset transistors 69a and 70a. A common reset signal RST is applied to the gates of the reset transistors 69a and 70a via the reset control wiring 87. The reset transistors 69a and 70a initialize (reset) the charges stored in the charge storage units 52a and 53a based on the reset signal RST. Instead of providing the two reset transistors 69a and 70a individually connected to the charge storage units 52a and 53a, one reset transistor commonly connected to the charge storage units 52a and 53a may be provided.

The gates of the amplification transistors 67a and 68a are connected to the charge storage units 52a and 53a. The sources of the selection transistors 65a and 66a are connected to the drains of the amplification transistors 67a and 68a. The amplification transistors 67a and 68a amplify the potentials of the charge storage units 52a and 53a.

The drains of the selection transistors 65a and 66a are connected to the vertical signal line 37. The selection signal SEL is applied to the gates of the selection transistors 65a and 66a via the pixel drive line (selection signal line) 36. The selection transistors 65a and 66a select the pixel 40a based on the selection signal SEL. When the pixel 40a is selected, the pixel signals VSL0 and VSL1 corresponding to the potential amplified by the amplification transistors 67a and 68a are output via the vertical signal line 37.

<Pixel Configuration>

Figure 4:
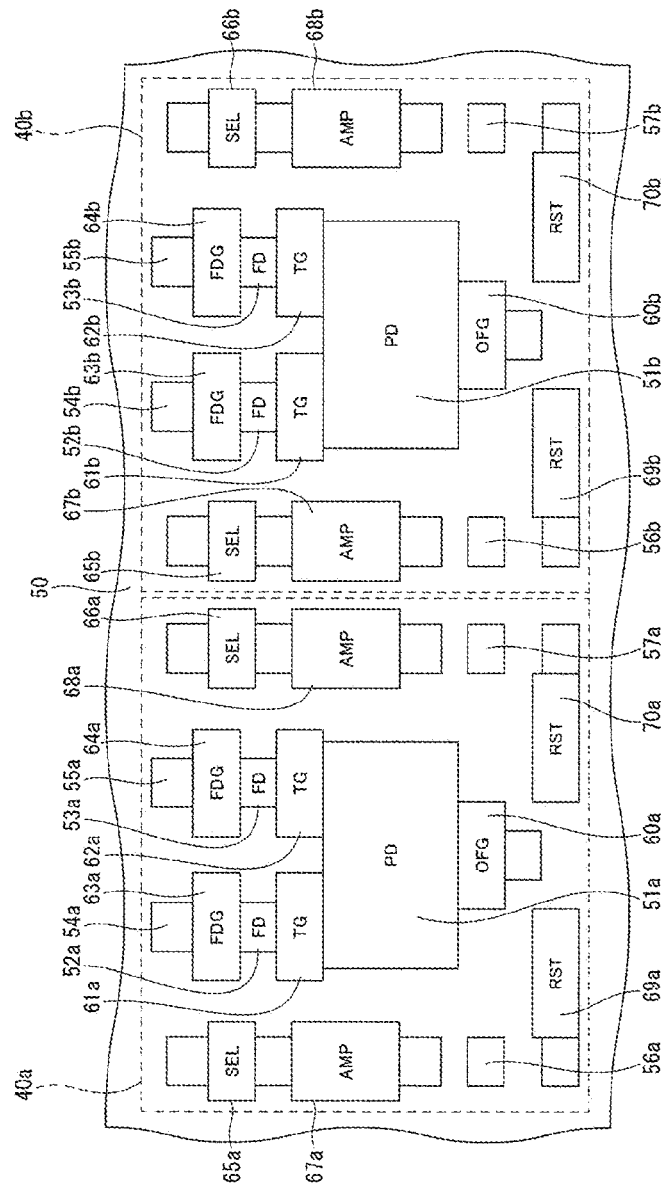
FIG. 4 is a plan view of a semiconductor substrate of pixels according to the first embodiment.

FIG. 4 shows a planar layout of the pixel 40a shown in FIG. 3 and the pixel 40b adjacent to the pixel 40a in the row direction on the semiconductor substrate 50. In the planar layout after FIG. 4, in order to facilitate understanding, labels "PD", "TG", "FD", "FDG", "RST", "SEL", "AMP", "OFG" are attached to each portion.

The pixel 40a on the left side of FIG. 4 has a planar layout that is line-symmetrical in the left-right direction (row direction) of FIG. 4. In the vertical direction (column direction) of FIG. 4, transfer transistors 61a and 62a, charge storage units 52a and 53a, and conversion efficiency adjustment transistors 63a and 64a are arranged above the photodiode 51a. Additional capacitance portions 54a and 55a constituted by a diffusion layer are arranged above the conversion efficiency adjustment transistors 63a and 64a.

A discharge transistor 60a and a reset transistor 69a and 70a are arranged below the photodiode 51a. In the left-right direction (row direction) of FIG. 4, selection transistors 65a and 66a, well contacts 56a and 57a, and amplification transistors 67a and 68a are arranged so as to sandwich the photodiode 51a.

The pixel 40b on the right side of FIG. 4 has the same configuration as the pixel 40a on the left side. The pixel 40b has a planar layout that is line-symmetrical in the left-right direction (row direction) of FIG. 4. In the vertical direction (column direction) of FIG. 4, transfer transistors 61b and 62b, charge storage units 52b and 53b, and conversion efficiency adjustment transistors 63b and 64b are arranged above the photodiode 51b. Additional capacitance portions 54b and 55b constituted by a diffusion layer are arranged above the conversion efficiency adjustment transistors 63b and 64b.

A discharge transistor 60b and reset transistors 69b and 70b are arranged below the photodiode 51b. In the left-right direction (row direction) of FIG. 4, selection transistors 65b and 66b, well contacts 56b and 57b, and amplification transistors 67b and 68b are arranged so as to sandwich the photodiode 51b. The planar layout of the pixels 40a and 40b shown in FIG. 4 is an example, and is not limited to the planar layout of the pixels 40a and 40b shown in FIG. 4.

Figure 5:
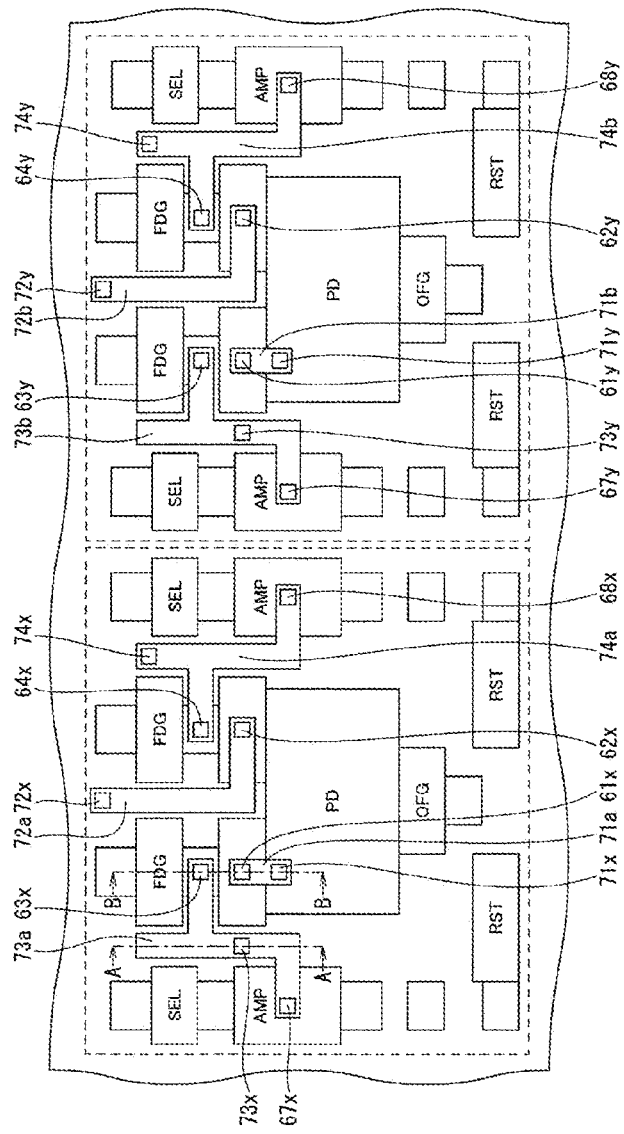
FIG. 5 is a plan view of a semiconductor substrate and a lower-layer wiring layer of pixels according to the first embodiment.
Figure 6:
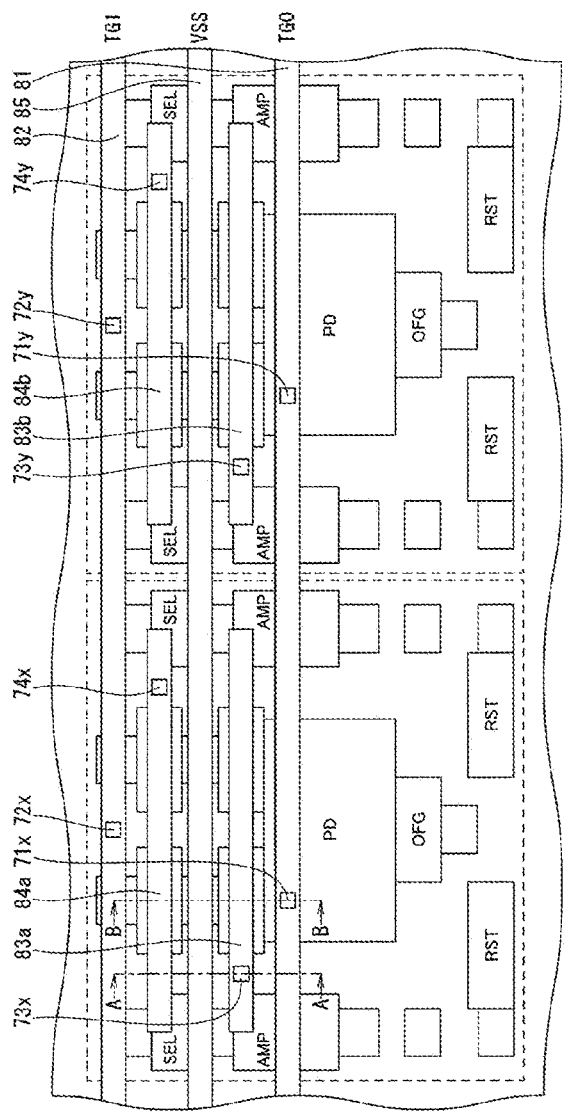
FIG. 6 is a plan view of a semiconductor substrate and an upper-layer wiring layer of pixels according to the first embodiment.

In FIG. 5, the planar layout of the wiring layer (hereinafter referred to as "lower-layer wiring layer") which is the lowest layer of the multilayer wiring structure on the semiconductor substrate 50 is superimposed on the planar layout on the semiconductor substrate 50 shown in FIG. 4. In FIG. 6, the planar layout of the wiring layer (hereinafter referred to as "upper-layer wiring layer") which is an upper layer of the lower-layer wiring layer is superimposed on the layout on the semiconductor substrate 50 shown in FIG. 4.

Note that, in FIGS. 5 and 6, only the wirings of interest among the wirings existing in the lower-layer wiring layer and the upper-layer wiring layer is shown, and some of the wirings existing in the lower-layer wiring layer and the upper-layer wiring layer are omitted. In FIGS. 5 and 6, only the wirings existing in the lower-layer wiring layer and the upper-layer wiring layer are designated for ease of viewing. The wirings except for the wirings existing in the lower-layer wiring layer and the upper-layer wiring layer in FIGS. 5 and 6 will be described with reference to the reference numerals shown in FIG. 4.

In the pixel 40a on the left side of FIG. 5, the lower-layer wiring layer includes the lower-layer wirings 71a, 72a, 73a and 74a. The lower-layer wiring 71a is connected to the gate electrode of the transfer transistor 61a via the lower-layer via 61x. The lower-layer wiring 72a is connected to the gate electrode of the transfer transistor 62a via the lower-layer via 62x. The lower-layer wiring 73a is connected to the charge storage unit 52a via the lower-layer via 63x, and is connected to the gate electrode of the amplification transistor 67a via the lower-layer via 67x. The lower-layer wiring 74a is connected to the charge storage unit 53a via the lower-layer via 64x, and is connected to the gate electrode of the amplification transistor 68a via the lower-layer via 68x.

In the pixel 40b on the right side of FIG. 5, the lower-layer wiring layer includes the lower-layer wirings 71b, 72b, 73b, and 74b. The lower-layer wiring 71b is connected to the gate electrode of the transfer transistor 61b via the lower-layer via 61y. The lower-layer wiring 72b is connected to the gate electrode of the transfer transistor 62b via the lower-layer via 62y. The lower-layer wiring 73b is connected to the charge storage unit 52b via the lower-layer via 63y, and is connected to the gate electrode of the amplification transistor 67b via the lower-layer via 67y. The lower-layer wiring 74b is connected to the charge storage unit 53b via the lower-layer via 64y, and is connected to the gate electrode of the amplification transistor 68b via the lower-layer via 68y.

As shown in FIG. 6, the upper-layer wiring layer includes transfer control wirings 81 and 82 and a reference potential wiring 85. The transfer control wirings 81 and 82 and the reference potential wiring 85 are arranged so as to extend in the left-right direction (row direction) of FIG. 6. The transfer control wiring 81 is connected to the lower-layer wirings 71a and 71b shown in FIG. 5 via the upper-layer vias 71x and 71y. That is, the transfer control wiring 81 is electrically connected to the gate electrodes of the transfer transistors 61a and 61b via the lower-layer vias 61x and 61y, the lower-layer wirings 71a and 71b, and the upper-layer vias 71x and 71y. The transfer control signal TG0 is applied to the gate electrodes of the transfer transistors 61a and 61b.

The transfer control wiring 82 is connected to the lower-layer wirings 72a and 72b shown in FIG. 5 via the upper-layer vias 72x and 72y. That is, the transfer control wiring 82 is connected to the gate electrode of the transfer transistor 62a and 62b via the lower-layer vias 62x and 62y, the lower-layer wirings 72a and 72b, and the upper-layer vias 72x and 72y. The transfer control signal TG1 is applied to the gate electrodes of the transfer transistors 62a and 62b via the transfer control wiring 82.

As shown in FIG. 6, the upper-layer wiring layer includes upper-layer wirings 83a and 84a on the pixel 40a side and upper-layer wirings 83b and 84b on the pixel 40b side. The upper-layer wiring 83a is connected to the lower-layer wiring 73a shown in FIG. 5 via the upper-layer via 73x. The upper-layer wiring 84a is connected to the lower-layer wiring 74a shown in FIG. 5 via the upper-layer via 74x. The upper-layer wiring 83b is connected to the lower-layer wiring 73b shown in FIG. 5 via the upper-layer via 73y. The upper-layer wiring 84b is connected to the lower-layer wiring 74b shown in FIG. 5 via the upper-layer via 74y.

That is, the lower-layer vias 63x, 67x, the lower-layer wiring 73a, the upper-layer via 73x, and the upper-layer wiring 83a constitute the connection wirings (63x, 67x, 73a, 73x, 83a) connected between the charge storage unit 52a and the gate electrode of the amplification transistor 67a. The connection wirings (63x, 67x, 73a, 73x, and 83a) connect the charge storage unit 52a and the gate electrode of the amplification transistor 67a in the lower-layer wiring layer, but the upper-layer wiring 83a which is a portion of the connection wirings (63x, 67x, 73a, 73x, and 83a) extends to the upper-layer wiring layer.

The lower-layer vias 64x and 68x, the lower-layer wiring 74a, the upper-layer via 74x, and the upper-layer wiring 84a constitute the connection wirings (64x, 68x, 74a, 74x, and 84a) connected between the charge storage unit 53a and the gate electrode of the amplification transistor 68a. The connection wirings (64x, 68x, 74a, 74x, and 84a) connect the charge storage unit 53a and the gate electrode of the amplification transistor 68a in the lower-layer wiring layer, but the upper-layer wiring 84a which is a portion of the connection wirings (64x, 68x, 74a, 74x, and 84a) extends to the upper-layer wiring layer.

The lower-layer vias 63y, 67y, the lower-layer wiring 73b, the upper-layer via 73y, and the upper-layer wiring 83b constitute the connection wirings (63y, 67y, 73b, 73y, and 83b) connected between the charge storage unit 52b and the gate electrode of the amplification transistor 67b. The connection wirings (63y, 67y, 73b, 73y, and 83b) connect the charge storage unit 53b and the gate electrode of the amplification transistor 68b in the lower-layer wiring layer, but the upper-layer wiring 83b which is a portion of the connection wirings (63y, 67y, 73b, 73y, and 83b) extends to the upper-layer wiring layer.

The lower-layer via 64y, 68y, the lower-layer wiring 74b, the upper-layer via 74y, and the upper-layer wiring 84b constitute the connection wirings (64y, 68y, 74b, 74y, and 84b) connected between the charge storage unit 53b and the gate electrode of the amplification transistor 68b. The connection wirings (64y, 68y, 74b, 74y, and 84b) connect the charge storage unit 53b and the gate electrode of the amplification transistor 68b in the lower-layer wiring layer, but the upper-layer wiring 84b which is a portion of the connection wirings (64y, 68y, 74b, 74y, and 84b) extends to the upper-layer wiring layer.

Figure 7:
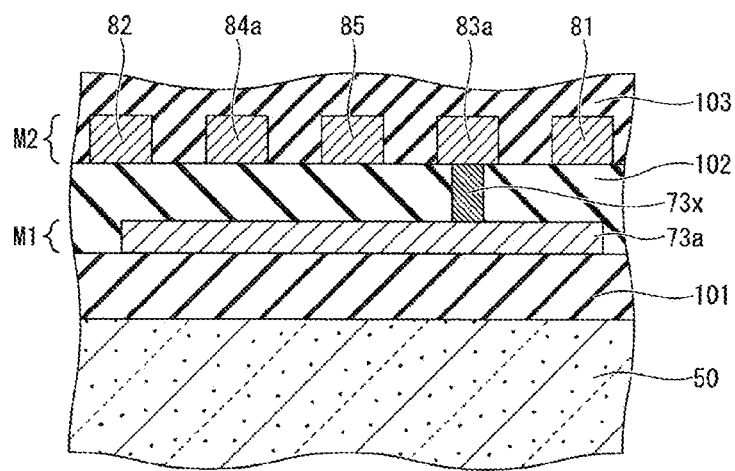
FIG. 7 is a cross-sectional view taken from the direction A-A of FIGS. 4 and 5.
Figure 8:
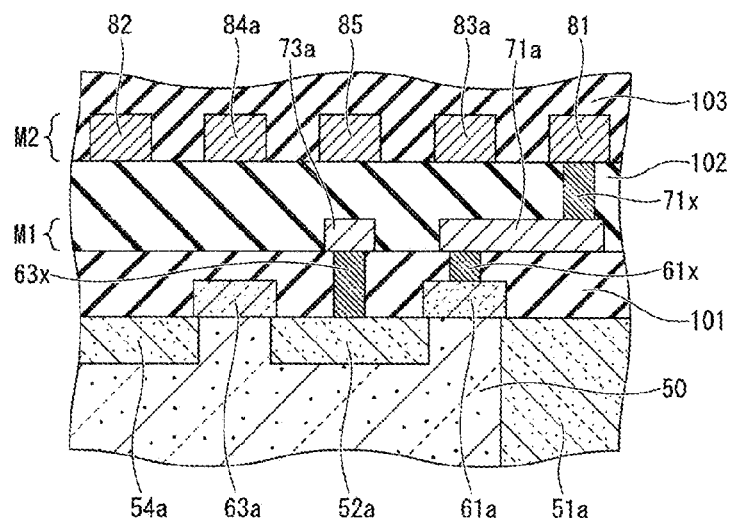
FIG. 8 is a cross-sectional view taken from the direction B-B of FIGS. 4 and 5.

FIG. 7 shows a cross-section taken from the direction A-A of FIGS. 5 and 6, and FIG. 8 shows a cross-section from the direction B-B of FIGS. 5 and 6. As shown in FIGS. 7 and 8, the lower-layer wiring layer M1 is arranged on the semiconductor substrate 50 via the interlayer insulating film 101. The upper-layer wiring layer M2 is arranged on the lower-layer wiring layer M1 via the interlayer insulating film 102. The upper-layer wiring layer M2 is covered with an interlayer insulating film 103. Although not shown in FIGS. 7 and 8, a multilayer wiring structure may be further arranged on the upper-layer wiring layer M2.

Figure 9:
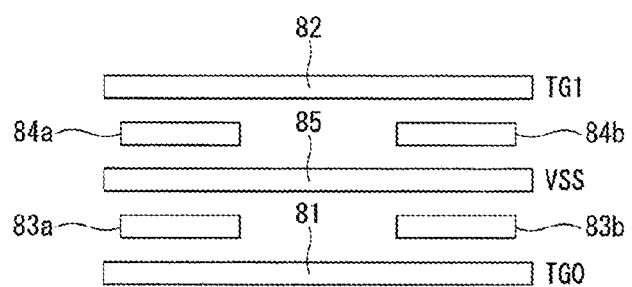
FIG. 9 is a plan view of an upper-layer wiring layer of pixels according to the first embodiment.

FIG. 9 shows a planar layout in which only the upper-layer wiring layer M2 shown in FIG. 6 is extracted. The transfer control wirings 81 and 82 are arranged so as to extend in the row direction. The upper-layer wirings 83a and 83b are adjacent to the transfer control wiring 81 and are arranged so as to extend in parallel with the transfer control wiring 82, and are capacitively coupled to the transfer control wiring 81. The upper-layer wirings 83a and 83b boost the potentials of the charge storage units 52a and 52b electrically connected to the upper-layer wirings 83a and 83b during the charge storage period (charge distribution period) of the charge storage units 52a and 52b by being capacitively coupling with the transfer control wiring 81.

Here, "boost" means changing the potentials of the charge storage units 52a and 52b so as to promote the transfer and non-transfer of charges. That is, the charge transfer period and the non-transfer period are repeated during the charge storage period of the charge storage units 52a and 52b. During the charge transfer period, since the transfer control signal TG0 applied to the transfer control wiring 81 is at the H level, the potentials of the charge storage units 52a and 52b are boosted (raised) to the positive side. As a result, the potential barrier due to the transfer transistors 61a and 61b adjacent to the charge storage units 52a and 52b is relaxed, and the transfer of charges from the transfer transistors 61a and 61b to the charge storage units 52a and 52b can be promoted. On the other hand, during the non-transfer period, since the transfer control signal TG0 applied to the transfer control wiring 81 is at the L level, the potentials of the charge storage units 52a and 52b are boosted (lowered) to the negative side. As a result, the potential barrier due to the transfer transistors 61a and 61b adjacent to the charge storage units 52a and 52b becomes high, and the non-transfer state of the charges can be promoted.

The upper-layer wirings 84a and 84b are adjacent to the transfer control wiring 82 and are arranged so as to extend in parallel with the transfer control wiring 82, and are capacitively coupled to the transfer control wiring 82. The upper-layer wirings 84a and 84b boost the potentials of the charge storage units 53a and 53b during the charge storage period (charge distribution period) of the charge storage units 53a and 53b electrically connected to the upper-layer wirings 84a and 84b by being capacitively coupled to the transfer control wiring 82.

A reference potential wiring 85 is arranged between the upper-layer wirings 83a and 83b and the upper-layer wirings 84a and 84b so as to extend in the row direction. During the charge storage period of the charge storage units 52a, 52b, 53a, and 53b, the reference potential VSS (for example, 0V which is the ground potential) is applied to the reference potential wiring 85.

Figure 10:
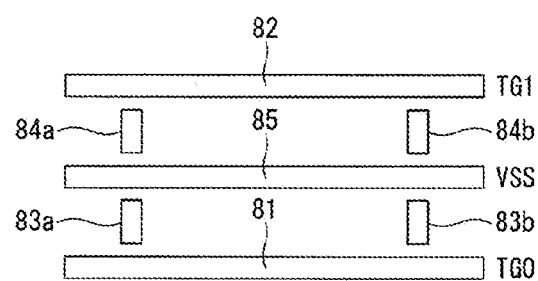
FIG. 10 is a plan view of a modified example of the upper-layer wiring layer of pixels according to the first embodiment.

The upper-layer wiring layer is not limited to the planar layout of FIG. 9. For example, as shown in FIG. 10, the upper-layer wirings 83a and 83b and the upper-layer wirings 83a and 83b may be arranged so as to extend in the row direction. The upper-layer wirings 83a and 83b and the upper-layer wirings 83a and 83b do not have to be a straight planar pattern, and may be, for example, a rectangular planar pattern. The upper-layer wirings 83a and 83b and the upper-layer wirings 83a and 83b may be positioned so as to be capacitively coupled to the transfer control wirings 81 and 82 even if they are not adjacent to the transfer control wirings 81 and 82.

<Distance Measuring Method>

Next, an example of the distance measuring method according to the first embodiment will be described with reference to the timing chart of FIG. 11. Here, the description will be focused on the pixel 40a, but the operation of the other pixels arranged in the pixel array unit 31 is the same as that of the pixel 40a. "FD0" and "FD1" in FIG. 11 indicate the transfer period and the non-transfer period of the signal charges to the charge storage units 52a and 52b, respectively.

Figure 11:
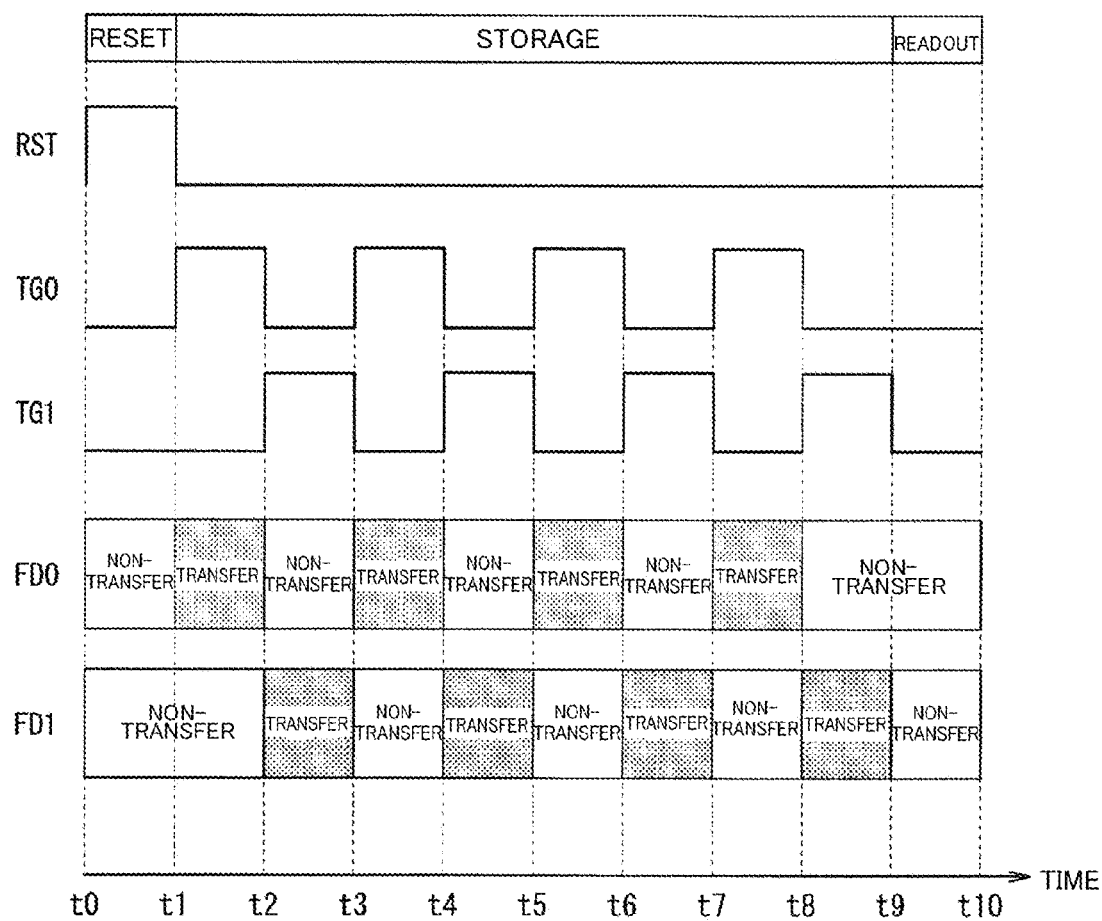
FIG. 11 is a timing chart of a distance measuring method according to the first embodiment.

Although the light emission pattern is not shown in FIG. 11, the light emitting unit 14 emits irradiation light modulated so as to repeat on/off of irradiation at predetermined timings. The reflected light is received by the photodiode 51a with a delay time corresponding to the distance to the object.

In the reset period from time t0 to t1, the H level is applied to the gates of the reset transistors 69a and 70a as the reset signal RST. The reset transistors 69a and 70a enter into the conduction state, and the charge storage units 52a and 53a are reset.

In the charge storage period from time t1 to t9, the L level is applied to the gates of the reset transistors 69a and 70a as the reset signal RST, so that the reset transistors 69a and 70a enter into the non-conduction state. Further, as the transfer control signals TG0 and TG1, the high (H) level and the low (L) level are repeatedly applied in opposite phases to the gates of the transfer transistors 61a and 62a. The transfer control signal TG0 is, for example, in phase with the light emission pattern, and the transfer control signal TG1 is out of phase with the light emission pattern. The transfer transistors 61a and 62a repeat the conduction state and the non-conduction state, and distribute the charges of the photodiode 51a to the charge storage units 52a and 53a.

At time t1 to t2, the H level is applied to the gate of the transfer transistor 61a as the transfer control signal TG0. The transfer transistor 61a enters into the conduction state and transfers the charges of the photodiode 51a to the charge storage unit 52a. At this time, since the upper-layer wiring 83a electrically connected to the charge storage unit 52a is capacitively coupled to the transfer control wiring 81 to which the transfer control signal TG0 is applied, the potential of the charge storage unit 52a is boosted to the positive side and the transfer of charges to the charge storage unit 52a is promoted.

On the other hand, at time t1 to t2, the L level is applied to the gate of the transfer transistor 62a as the transfer control signal TG1. The transfer transistor 62a enters into the non-conduction state, and the charges are not transferred to the charge storage unit 53a. At this time, since the upper-layer wiring 84a electrically connected to the charge storage unit 53a is capacitively coupled to the transfer control wiring 82 to which the transfer control signal TG1 is applied, the potential of the charge storage unit 53a is boosted to the negative side and the non-transfer state of the charges to the charge storage unit 53a is promoted.

At time t2 to t3, the H level of the transfer control signal TG0 is inverted and the L level is applied to the gate of the transfer transistor 61a. The transfer transistor 61a enters into the non-conduction state, and the charges are not transferred to the charge storage unit 52a. At this time, since the upper-layer wiring 83a electrically connected to the charge storage unit 52a is capacitively coupled to the transfer control wiring 81 to which the transfer control signal TG0 is applied, the potential of the charge storage unit 52a is boosted to the negative side and the non-transfer state of the charges to the charge storage unit 52a is promoted.

On the other hand, at time t2 to t3, the L level of the transfer control signal TG1 is inverted and the H level is applied to the gate of the transfer transistor 62a. The transfer transistor 62a enters into the conduction state, and charges are transferred to the charge storage unit 53a. At this time, since the upper-layer wiring 84a electrically connected to the charge storage unit 53a is capacitively coupled to the transfer control wiring 82 to which the transfer control signal TG1 is applied, the potential of the charge storage unit 53a is boosted to the positive side and the transfer of charges to the charge storage unit 53a is promoted. Even at time t3 to t9, charges are stored in the charge storage units 52a and 53a by repeating the same operations as at time t1 to t3.

In the readout period from time t9 to t10, although not shown in FIG. 11, the H level is applied to the gate of the selection transistor 65a as the selection signal SEL. The selection transistor 65a enters into the conduction state, the amounts of charges stored in the charge storage units 52a and 53a are read out, and the detection signal corresponding to the amount of charges is output to the signal processing unit 13 shown in FIG. 1. The signal processing unit 13 calculates the distance to the object based on the detection signal.

Although the two-phase transfer period is illustrated in FIG. 11, it is not particularly limited. For example, by switching the conversion efficiency adjustment transistors 63a and 64a on and off in one frame, it is possible to set a four-phase transfer period in one frame. Further, one frame may be divided into two periods, and a total of four phases of transfer periods may be set in the two periods.

As described above, according to the first embodiment, the upper-layer wirings 83a and 83b are capacitively coupled to the transfer control wiring 81 for driving in the same phase, and the upper-layer wirings 84a and 84b are capacitively coupling to the transfer control wiring 82 for driving in the same phase. As a result, during the charge storage period of the charge storage units 52a and 53a, the potentials are boosted to the positive potential side during the charge transfer period and boosted to the negative potential side during the non-transfer period. In this way, it is possible to suppress transfer failures at low on-voltage.

Second Embodiment

Figure 12:
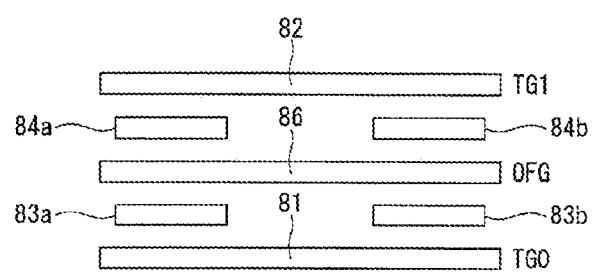
FIG. 12 is a plan view of an upper-layer wiring layer of pixels according to a second embodiment.

The distance measuring device according to the second embodiment is different from the distance measuring device according to the first embodiment shown in FIG. 9 in that, as shown in FIG. 12, a discharge control wiring 86 extending in the row direction is arranged between the upper-layer wirings 83a and 83b and the upper-layer wirings 84a and 84b.

The discharge control wiring 86 is adjacent to the upper-layer wirings 83a and 83b and the upper-layer wirings 84a and 84b, and is arranged so as to extend in parallel with the upper-layer wirings 83a and 83b and the upper-layer wirings 84a and 84b. The upper-layer wirings 83a and 83b and the upper-layer wirings 84a and 84b are capacitively coupled to the discharge control wiring 86. The discharge control wiring 86 is electrically connected to the gate electrodes of the discharge transistors 60a and 60b shown in FIG. 4. A discharge signal OFG is applied to the gate electrodes of the discharge transistors 60a and 60b shown in FIG. 4 via the discharge control wiring 86.

The upper-layer wirings 83a and 83b and the upper-layer wirings 84a and 84b are also capacitively coupled to the transfer control wirings 81 and 82 as in the first embodiment. The transfer control wirings 81 and 82 may not be arranged in the same wiring layer as the upper-layer wirings 83a and 83b and the upper-layer wirings 84a and 84b. Since the other configurations of the distance measuring device according to the second embodiment are the same as those of the distance measuring device according to the first embodiment, duplicated description will be omitted.

Next, the distance measuring method according to the second embodiment will be described with reference to the timing chart of FIG. 13. "FD0" and "FD1" in FIG. 13 indicate the transfer period and the non-transfer period of the signal charges to the charge storage units 52a and 52b, respectively.

In the reset period from time t0 to t1, the H level is applied to the gates of the reset transistors 69a and 70a as the reset signal RST. The reset transistors 69a and 70a enter into the conduction state, and the charge storage units 52a and 53a are reset. At this time, the H level is applied to the gate of the discharge transistor 60a as the discharge signal OFG. The discharge transistor 60a enters into the conduction state, and the charges of the photodiode 51a are discharged.

In the charge storage period from time t1 to t9, the H level and the L level are alternately repeated as transfer control signals TG0 and TG1 and applied to the gates of the transfer transistors 61a and 62a. The transfer transistors 61a and 62a repeat the conduction state and the non-conduction state, and distribute the charges of the photodiode 51a to the charge storage units 52a and 53a. At this time, by setting the discharge signal OFG of the discharge transistor 60a to an intermediate potential between the L level and the H level, the charge storage units 52a and 53a capacitively coupled to the discharge control wiring 86 are boosted.

Figure 13:
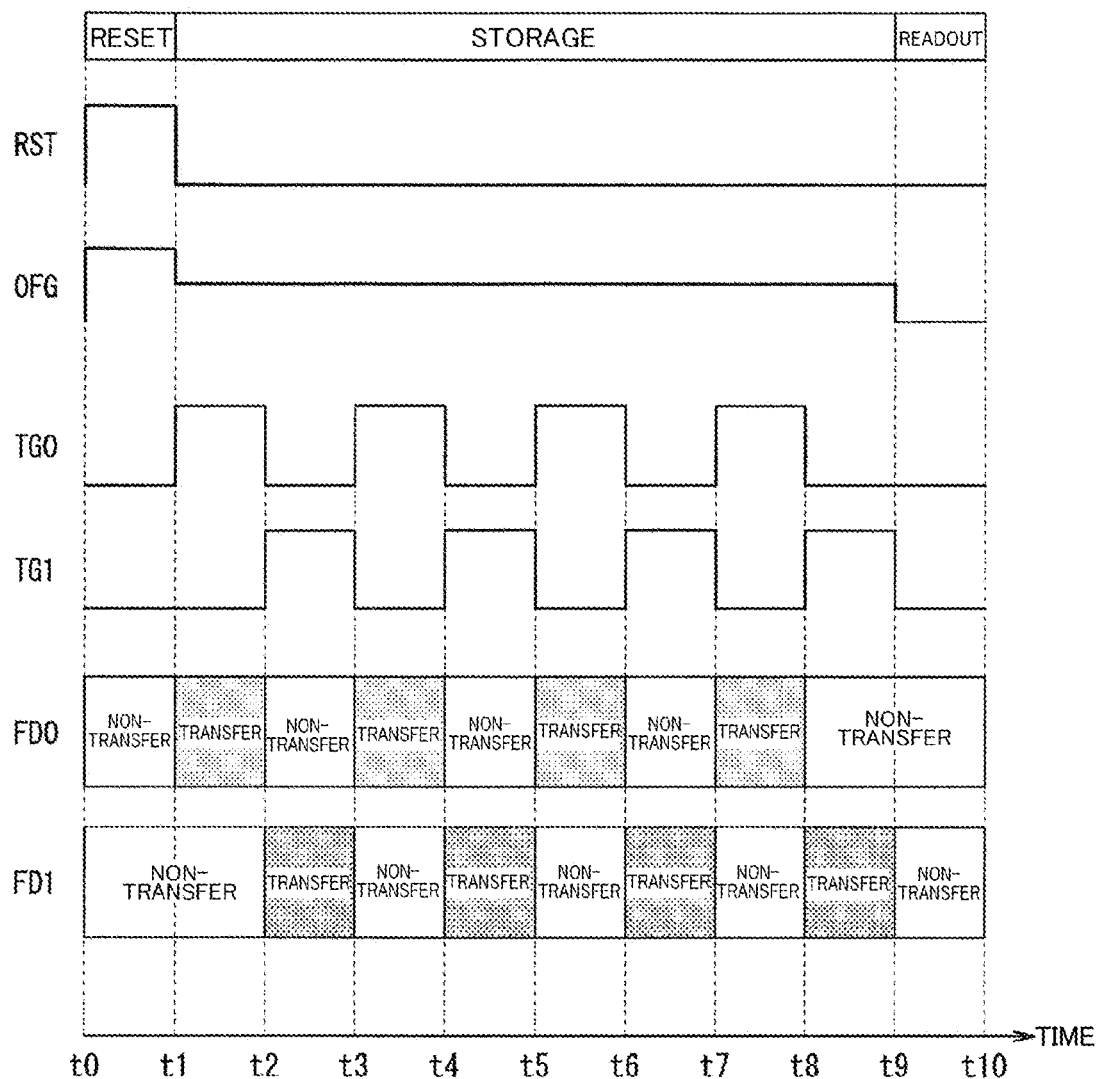
FIG. 13 is a timing chart of a distance measuring method according to the second embodiment.

In the readout period from time t9 to t10, although not shown in FIG. 13, the H level is applied to the gate of the selection transistor 65a as the selection signal SEL. The selection transistor 65a enters into the conduction state, the amounts of charges stored in the charge storage units 52a and 53a are read out, and the detection signal corresponding to the amount of charges is output to the signal processing unit 13 shown in FIG. 1. The signal processing unit 13 calculates the distance to the object based on the detection signal.

According to the distance measuring device according to the second embodiment, the upper-layer wirings 83a and 83b and the upper-layer wirings 84a and 84b extend to the same wiring layer as the discharge control wiring 86 electrically connected to the gates of the discharge transistors 60a and 60b, so that the upper-layer wirings 83a and 83b and the upper-layer wirings 84a and 84b can be capacitively coupled to the discharge control wiring 86, and the charge storage units 52a and 53a can be boosted.

Third Embodiment

Figure 14:
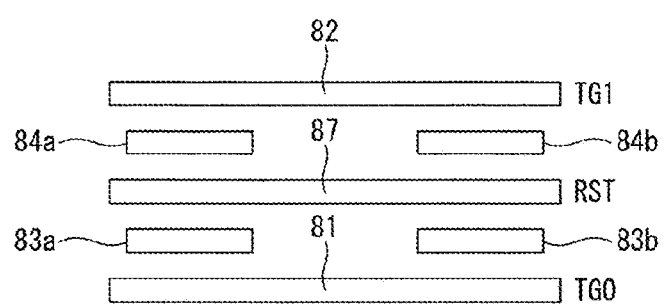
FIG. 14 is a plan view of an upper-layer wiring layer of pixels according to a third embodiment.

The distance measuring device according to the third embodiment is different from the distance measuring device according to the first embodiment shown in FIG. 8 in that, as shown in FIG. 14, a reset control wiring 87 extending in the row direction is arranged between the upper-layer wirings 83a and 83b and the upper-layer wirings 84a and 84b.

The reset control wiring 87 is adjacent to the upper-layer wirings 83a and 83b and the upper-layer wirings 84a and 84b, and is arranged so as to extend in parallel with the upper-layer wirings 83a and 83b and the upper-layer wirings 84a and 84b. The upper-layer wirings 83a and 83b and the upper-layer wirings 84a and 84b are capacitively coupled to the reset control wiring 87. The reset control wiring 87 is electrically connected to the gate electrodes of the reset transistors 69a, 70a, 69b, and 70b shown in FIG. 4. A reset signal RST is applied to the gate electrodes of the reset transistors 69a, 70a, 69b, and 70b shown in FIG. 4 via the reset control wiring 87.

The upper-layer wirings 83a and 83b and the upper-layer wirings 84a and 84b are also capacitively coupled to the transfer control wirings 81 and 82. The transfer control wirings 81 and 82 may not be arranged in the same wiring layer as the upper-layer wirings 83a and 83b and the upper-layer wirings 84a and 84b. Since the other configurations of the distance measuring device according to the third embodiment are the same as those of the distance measuring device according to the first embodiment, duplicated description will be omitted.

Figure 15:
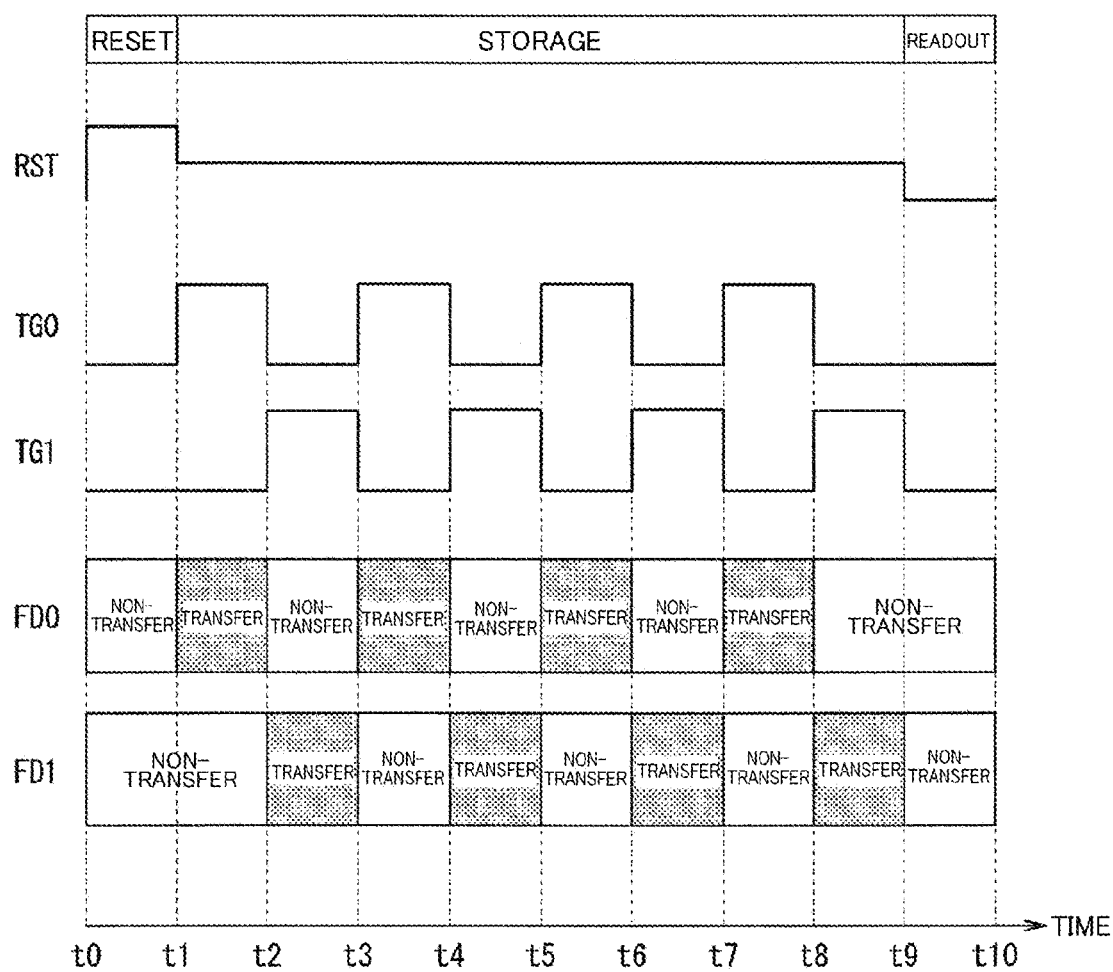
FIG. 15 is a timing chart of a distance measuring method according to the third embodiment.

Next, the distance measuring method according to the third embodiment will be described with reference to the timing chart of FIG. 15. "FD0" and "FD1" in FIG. 15 indicate the transfer period and the non-transfer period of the signal charges to the charge storage units 52a and 52b, respectively.

In the reset period from time t0 to t1, the H level is applied to the gates of the reset transistors 69a and 70a as the reset signal RST. The reset transistors 69a and 70a enter into the conduction state, and the charge storage units 52a and 53a are reset.

At time t1 to t9, the H level and the L level are alternately repeated as transfer control signals TG0 and TG1 and applied to the gates of the transfer transistors 61a and 62a. The transfer transistors 61a and 62a repeat the conduction state and the non-conduction state, and distribute the charges of the photodiode 51a to the charge storage units 52a and 53a. At this time, the charge storage units 52a and 53a are boosted by applying an intermediate potential between the L level and the H level as the reset signal RST. Since the reset signal RST is an intermediate potential, the charge storage units 52a and 53a are not reset and the charges are stored. When the conversion efficiency adjustment signals FDG of the conversion efficiency adjustment transistors 63a and 64a are at the L level and the conversion efficiency is high, the reset signal RST may be set to the H level at time t1 to t9.

In the readout period from time t9 to t10, the L level is applied as the reset signal RST. Since the other operation in the readout period is the same as the distance measuring method according to the first embodiment, duplicated description will be omitted.

According to the distance measuring device according to the third embodiment, the upper-layer wirings 83a, 83b, 84a, and 84b extend to the same wiring layer as the reset control wiring 87, so that the upper-layer wirings 83a, 83b, 84a, and 84b and the reset control wiring 87 can be capacitively coupled. Then, by setting the reset signal RST to an intermediate potential during charge storage, the charge storage units 52a, 52b, 53a, and 53b can be boosted.

Fourth Embodiment

Figure 16:
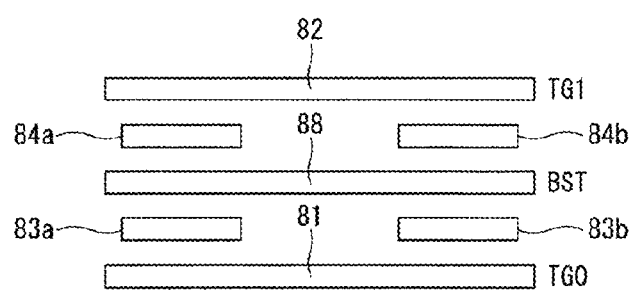
FIG. 16 is a plan view of an upper-layer wiring layer of pixels according to a fourth embodiment.

The distance measuring device according to the fourth embodiment is different from the distance measuring device according to the first embodiment shown in FIG. 9 in that, as shown in FIG. 16, a boost wiring 88 extending in the row direction is arranged between the upper-layer wirings 83a and 83b and the upper-layer wirings 84a and 84b.

The boost wiring 88 is adjacent to the upper-layer wirings 83a and 83b and the upper-layer wirings 84a and 84b, and is arranged so as to extend in parallel with the upper-layer wirings 83a and 83b and the upper-layer wirings 84a and 84b. The upper-layer wirings 83a and 83b and the upper-layer wirings 84a and 84b are capacitively coupled to the boost wiring 88. The boost wiring 88 is a wiring provided to boost the charge storage units 52a and 53a. A boost signal BST is applied to the boost wiring 88.

The upper-layer wirings 83a and 83b and the upper-layer wirings 84a and 84b are also capacitively coupled to the transfer control wirings 81 and 82. The transfer control wirings 81 and 82 may not be arranged in the same wiring layer as the upper-layer wirings 83a and 83b and the upper-layer wirings 84a and 84b. Since the other configurations of the distance measuring device according to the fourth embodiment are the same as those of the distance measuring device according to the first embodiment, duplicated description will be omitted.

Figure 17:
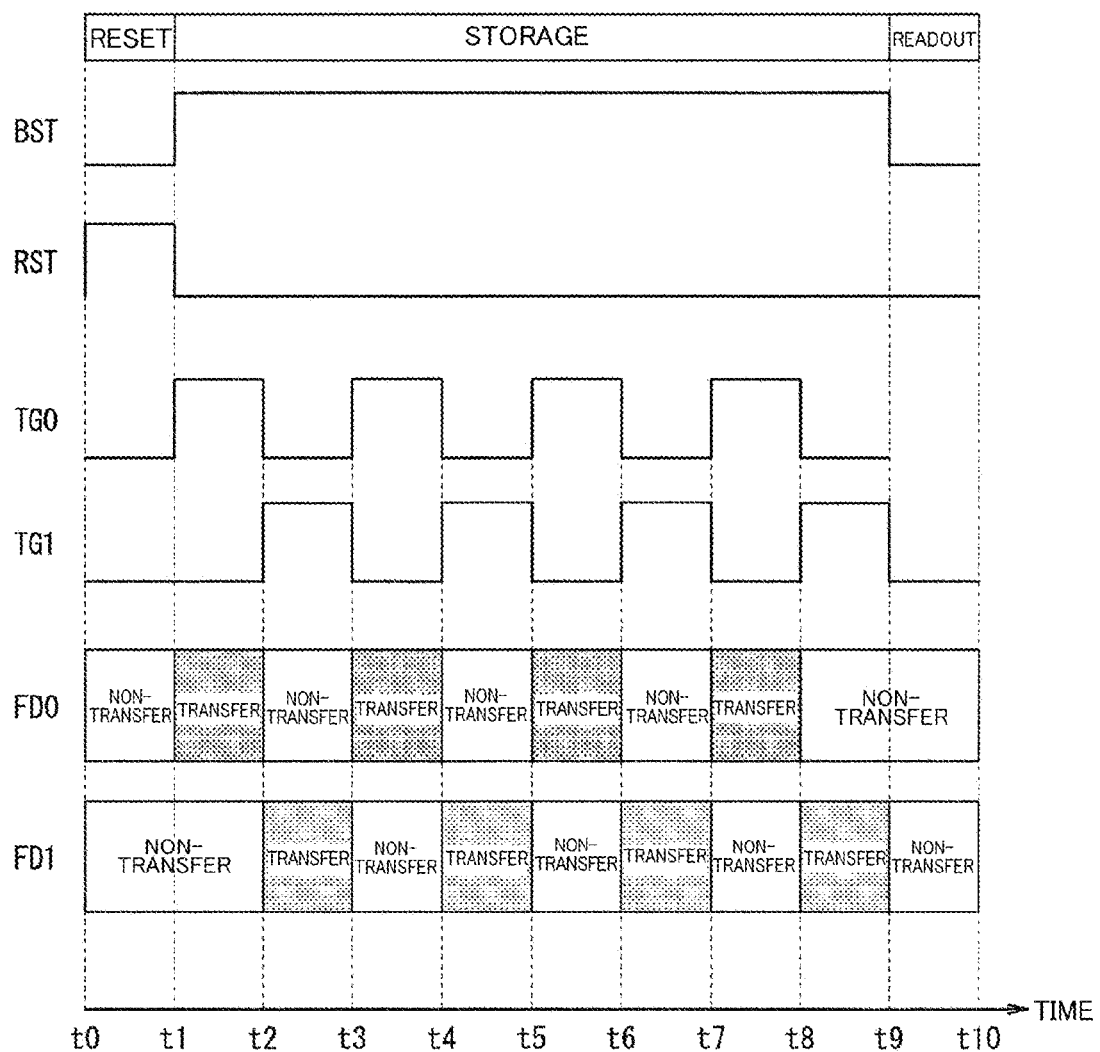
FIG. 17 is a timing chart of a distance measuring method according to the fourth embodiment.

Next, the distance measuring method according to the fourth embodiment will be described with reference to the timing chart of FIG. 17. "FD0" and "FD1" in FIG. 17 indicate a transfer period and a non-transfer period of signal charges to the charge storage units 52a and 52b, respectively.

In the reset period from time t0 to t1, the H level is applied to the gates of the reset transistors 69a and 70a as the reset signal RST. The reset transistors 69a and 70a enter into the conduction state, and the charge storage units 52a and 53a are reset. At this time, the L level is applied to the boost signal BST.

At time t1 to t9, the H level and the L level are alternately repeated as transfer control signals TG0 and TG1 and applied to the gates of the transfer transistors 61a and 62a. The transfer transistors 61a and 62a repeat the conduction state and the non-conduction state, and distribute the charges of the photodiode 51a to the charge storage units 52a and 53a. At this time, by applying the H level as the boost signal BST, the charge storage units 52a and 53a capacitively coupled to the boost wiring 88 are boosted.

In the readout period from time t9 to t10, the L level is applied as the boost signal BST. Since the other operation of the readout period is the same as the distance measuring method according to the first embodiment, duplicated description will be omitted.

According to the distance measuring device according to the fourth embodiment, the upper-layer wirings 83a and 83b and the upper-layer wirings 84a and 84b and the boost wiring 88 are arranged in the same wiring layer, so that the upper-layer wirings 83a and 83b and the upper-layer wiring 84a and 84b and the boost wiring 88 can be capacitively coupled, and the charge storage units 52a, 52b, 53a, and 53b can be boosted.

Fifth Embodiment

Figure 18:
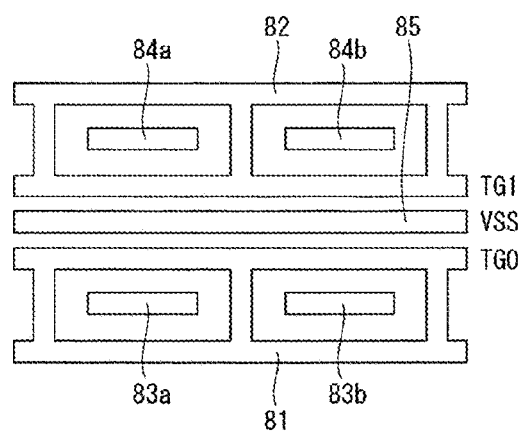
FIG. 18 is a plan view of an upper-layer wiring layer of pixels according to a fifth embodiment.

The distance measuring device according to the fifth embodiment is different from the distance measuring device according to the first embodiment shown in FIG. 9 in that, as shown in FIG. 18, the transfer control wiring 81 is arranged so as to surround the upper-layer wirings 83a and 83b, and the transfer control wiring 82 is arranged so as to surround the upper-layer wirings 84a and 84b.

A reference potential wiring 85 is arranged between the transfer control wirings 81 and 82. The reference potential wiring 85 may not be provided, and other wiring may be arranged. Since the other configuration of the distance measuring device according to the fifth embodiment is the same as that of the distance measuring device according to the first embodiment, duplicated description will be omitted.

According to the distance measuring device according to the fifth embodiment, since the upper-layer wirings 83a and 83b and the upper-layer wirings 84a and 84b are surrounded by the transfer control wirings 81 and 82, the amount of capacitive coupling between the upper-layer wirings 83a and 83b and the upper-layer wirings 84a and 84b and the transfer control wirings 81 and 82 is increased, and the charge storage units 52a, 52b, 53a and 53b can be further boosted.

Sixth Embodiment

Figure 19:
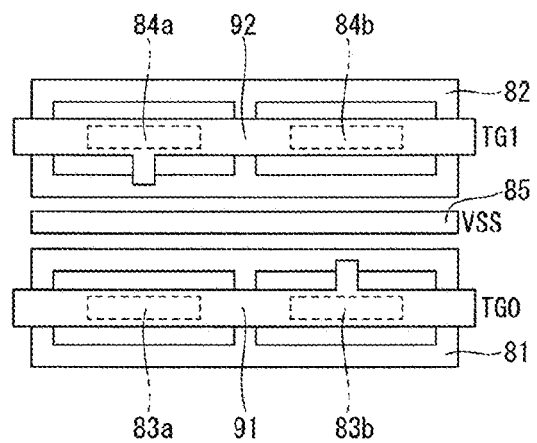
FIG. 19 is a plan view of an upper-layer wiring layer and a third wiring layer of pixels according to a sixth embodiment.

The distance measuring device according to the sixth embodiment is different from the distance measuring device according to the fifth embodiment shown in FIG. 18 in that, as shown in FIG. 19, transfer control wirings 91 and 92 are arranged in a wiring layer which is an upper layer of the transfer control wirings 81 and 82 for the purpose of lowering the time constant CR.

The transfer control wirings 91 and 92 are constituted by semi-global wirings having a wider wiring width than, for example, the transfer control wirings 81 and 82. The transfer control wirings 91 and 92 are connected to the transfer control wirings 81 and 82 via vias (not shown). The transfer control wirings 91 and 92 are arranged in parallel in the wiring layer which is an upper layer of the upper-layer wirings 83a and 83b and the upper-layer wirings 84a and 84b so as to overlap the upper-layer wirings 83a and 83b and the upper-layer wirings 84a and 84b, and the transfer control wirings 91 and 92 are capacitively coupled to the upper-layer wirings 83a and 83b and the upper-layer wirings 84a and 84b.

Figure 20:
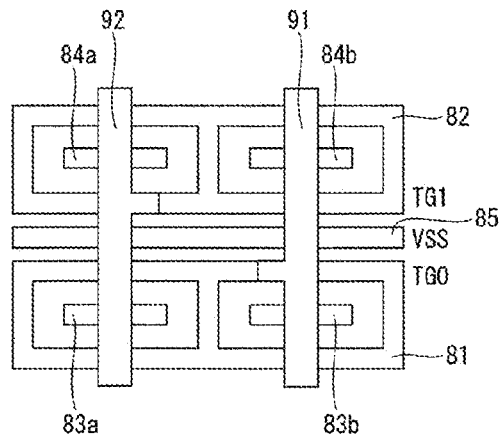
FIG. 20 is a plan view of a modified example of the upper-layer wiring layer and the third wiring layer of pixels according to the sixth embodiment.

Further, as shown in FIG. 20, the transfer control wirings 91 and 92 may extend in a direction (row direction) orthogonal to the extension direction of the upper-layer wirings 83a and 83b and the upper-layer wirings 84a and 84b. The transfer control wirings 91 and 92 are arranged so as to overlap portions of the upper-layer wirings 83a and 83b and the upper-layer wirings 84a and 84b in the wiring layer which is an upper layer of the upper-layer wirings 83a and 83b and the upper-layer wirings 84a and 84b, and the transfer control wirings 91 and 92 are capacitively coupled to the upper-layer wirings 83a and 83b and the upper-layer wirings 84a and 84b.

According to the distance measuring device according to the sixth embodiment, the upper-layer wirings 83a and 83b and the upper-layer wirings 84a and 84b are surrounded by the transfer control wirings 81 and 82 as in the distance measuring device according to the fifth embodiment. Therefore, the amount of capacitive coupling between the upper-layer wirings 83a and 83b and the upper-layer wirings 84a and 84b and the transfer control wirings 81 and 82 is increased, and the charge storage units 52a, 52b, 53a and 53b can be further boosted. Since the upper-layer wirings 83a and 83b and the upper-layer wirings 84a and 84b are capacitively coupled to the transfer control wirings 91 and 92 in the wiring layer which is an upper layer of the upper-layer wirings 83a and 83b and the upper-layer wirings 84a and 84b, the charge storage units 52a, 52b, 53a, and 53b can be further boosted.

Seventh Embodiment

Figure 21:
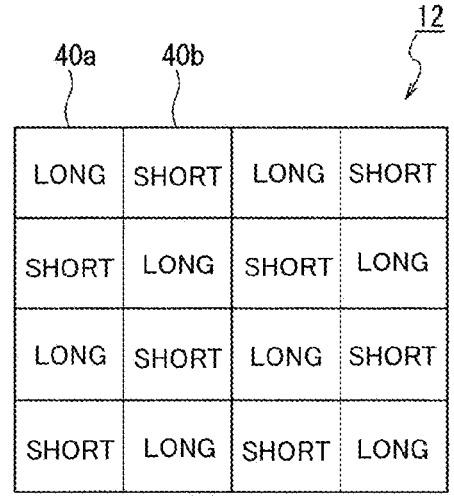
FIG. 21 is a schematic diagram of a pixel array unit according to a seventh embodiment.

The distance measuring device according to the fifth embodiment is different from the distance measuring device according to the first embodiment in that, as shown in FIG. 21, the pixel array unit 31 includes a pixel (hereinafter referred to as "long storage pixel") 40a that stores charges for a relatively long period and a pixel (hereinafter, referred to as a "short storage pixel") 40b that stores charges in a relatively short period. The long storage pixels 40a and the short storage pixels 40b are arranged in a staggered pattern.

Figure 22:
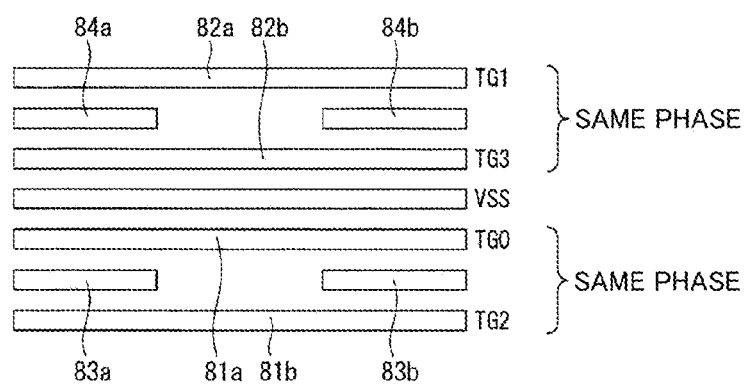
FIG. 22 is a plan view of an upper-layer wiring layer of pixels according to the seventh embodiment.

As shown in FIG. 22, the upper-layer wirings 83a and 83b are arranged so as to be sandwiched between the transfer control wirings 81a and 81b, and are capacitively coupled to the transfer control wirings 81a and 81b. The transfer control wiring 81a is electrically connected to the gate of the transfer transistor 61a of the long storage pixel 40a. The transfer control signal TG0 is electrically applied to the gate of the transfer transistor 61a of the long storage pixel 40a via the transfer control wiring 81a. The transfer control wiring 81b is electrically connected to the gate of the transfer transistor 61b of the short storage pixel 40b. A transfer control signal TG2 having the same phase as the transfer control signal TG0 is electrically applied to the gate of the transfer transistor 61b of the short storage pixel 40b via the transfer control wiring 81b.

The upper-layer wirings 84a and 84b are arranged so as to be sandwiched between the transfer control wirings 82a and 82b, and are capacitively coupled to the transfer control wirings 82a and 82b. The transfer control wiring 82a is electrically connected to the gate of the transfer transistor 62a of the long storage pixel 40a. The transfer control signal TG1 is electrically applied to the gate of the transfer transistor 62a of the long storage pixel 40a via the transfer control wiring 82a. The transfer control wiring 82b is electrically connected to the gate of the transfer transistor 62b of the short storage pixel 40b. A transfer control signal TG3 having the same phase as the transfer control signal TG1 is electrically applied to the gate of the transfer transistor 62b of the short storage pixel 40b via the transfer control wiring 81b.

A reference potential wiring 85 is arranged between the transfer control wirings 81a and 82b. The reference potential wiring 85 may not be provided, and other wiring may be arranged. Since the other configuration of the distance measuring device according to the sixth embodiment is the same as that of the distance measuring device according to the first embodiment, duplicated description will be omitted.

Figure 23:
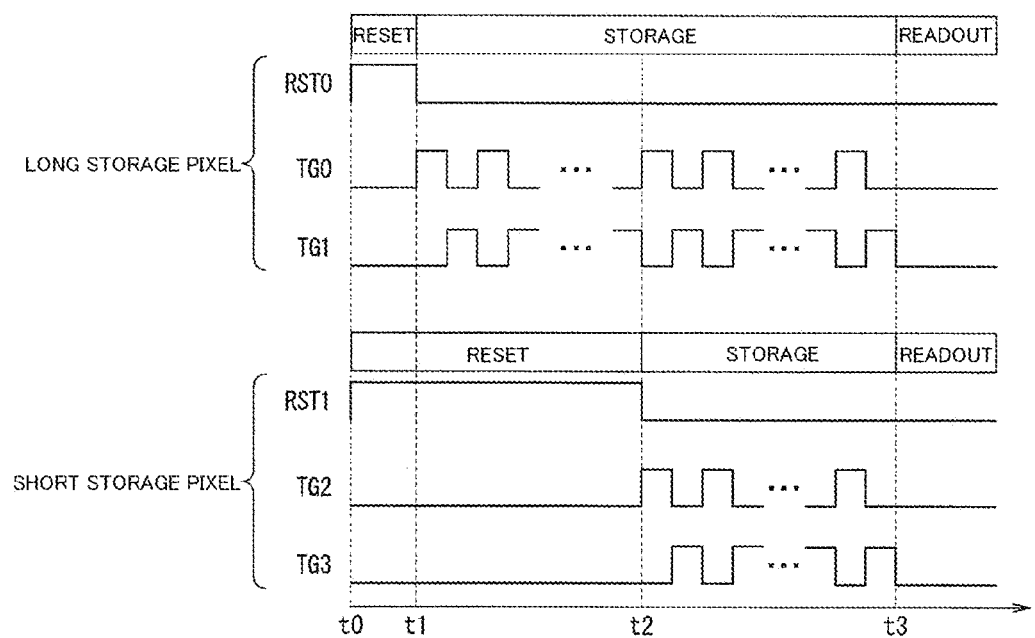
FIG. 23 is a timing chart of a distance measuring method according to the seventh embodiment.

Next, with reference to the timing chart of FIG. 23, the distance measuring method according to the seventh embodiment will be described focusing on the long storage pixel 40a and the short storage pixel 40b.

In the long storage pixel 40a, the H level is applied to the gates of the reset transistors 69a and 70a as the reset signal RST0 during the reset period from time t0 to t1. The reset transistors 69a and 70a enter into the conduction state, and the charge storage units 52a and 53a are reset. At this time, since the L level is applied to the gates of the transfer transistors 61a and 62a as the transfer control signals TG0 and TG1, the transfer transistors 61a and 62a enter into the non-conduction state.

In the charge storage period from time t1 to t3, the L level is applied as the reset signal RST0. Further, as the transfer control signals TG0 and TG1, the H level and the L level are repeatedly applied in opposite phases to the gates of the transfer transistors 61a and 62a. The transfer transistors 61a and 62a distribute charges to the charge storage units 52a and 53a by repeating the conduction state and the non-conduction state in opposite phases.

In the charge storage period from time t1 to t3, at time t1 to t2, the charge storage unit 52a is boosted by the capacitive coupling between the upper-layer wiring 83a and the transfer control wiring 81a. The charge storage unit 53a is boosted by the capacitive coupling between the upper-layer wiring 84a and the transfer control wiring 82a. In the charge storage period from time t1 to t3, at time t2 to t3, the transfer control signals TG2 and TG3 on the short storage pixel 40b side also repeat the H level and the L level in opposite phases. Therefore, the charge storage unit 52a is boosted by the capacitive coupling between the upper-layer wiring 83a and the transfer control wirings 81a and 81b. The charge storage unit 53a is boosted by the capacitive coupling between the upper-layer wiring 84a and the transfer control wirings 82a and 82b.

After time t3, the readout period is set, and the pixel signals corresponding to the charges of the charge storage units 52a and 53a are read out.

On the other hand, in the short storage pixel 40b, the H level is applied to the gates of the reset transistors 69b and 70b as the reset signal RST1 in the reset period from time t0 to t2, which is longer than the reset period of the long storage pixel 40a. The reset transistors 69b and 70b enter into the conduction state, and the charge storage units 52b and 53b are reset. At this time, since the L level is applied to the gates of the transfer transistors 61b and 62b as the transfer control signals TG2 and TG3, the transfer transistors 61b and 62b enter into the non-conduction state.

Since the L level is applied to the gates of the reset transistors 69b and 70b as the reset signal RST1 in the charge storage period of t2 to t3, which is shorter than the charge storage period of the long storage pixel 40a, the reset transistors 69b and 70b enter into the non-conduction state. At this time, the H level and the L level are alternately repeated as the transfer control signals TG2 and TG3 and applied to the gates of the transfer transistors 61b and 62b. The transfer transistors 61b and 62b distribute charges to the charge storage units 52b and 53b by alternately repeating the conduction state and the non-conduction state in opposite phases. At this time, the charge storage unit 52a is boosted by the capacitive coupling between the upper-layer wiring 83a and the transfer control wirings 81a and 81b. The charge storage unit 53a is boosted by the capacitive coupling between the upper-layer wiring 84a and the transfer control wirings 82a and 82b.

In the read-out period after time t3, which is the same as the read-out period of the long storage pixel 40a, the pixel signal corresponding to the charges of the charge storage units 52b and 53b is read out.

According to the distance measuring device of the seventh embodiment, in the long storage pixels 40a and the short storage pixels 40b, the upper-layer wirings 83a and 83b are sandwiched with the transfer control wirings 81a and 81b which drive in the same phase and capacitively coupled with the transfer control wirings 81a and 81b. The upper-layer wirings 84a and 84b are sandwiched with the transfer control wirings 82a and 82b which drive in the same phase and capacitively coupled with the transfer control wirings 82a and 82b. As a result, the charge storage units 52a and 53a of the long storage pixel 40a and the charge storage units 52b and 53b of the short storage pixel 40b can be boosted, and transfer failures can be suppressed.

Eighth Embodiment

Figure 24:
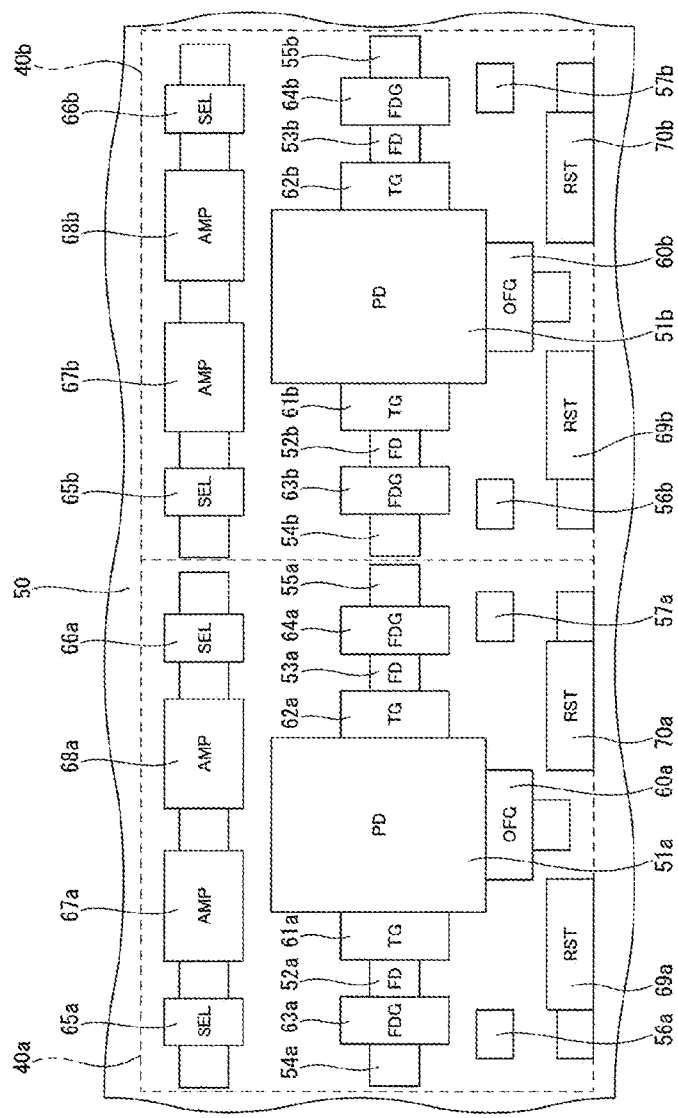
FIG. 24 is a plan view of a semiconductor substrate of pixels according to an eighth embodiment.

The distance measuring device according to the eighth embodiment is different in that, as shown in FIG. 24, the planar layout of the pixels 40a and 40b on the semiconductor substrate 50 is different from that the distance measuring device according to the first embodiment shown in FIG. 4.

The pixel 40a on the left side of FIG. 24 has a planar layout that is line-symmetrical in the left-right direction (row direction) of FIG. 24. In the left-right direction (row direction) of FIG. 24, the photodiode 51a is arranged in the center, and the transfer transistors 61a and 62a, the charge storage units 52a and 53a, and the conversion efficiency adjustment transistors 63a and 64a are arranged so as to sandwich the photodiode 51a. In the vertical direction (column direction) of FIG. 24, the selection transistors 65a and 66a and the amplification transistors 67a and 68a are arranged above the photodiode 51a. A discharge transistor 60a and reset transistors 69a and 70a are arranged below the photodiode 51a.

The pixel 40b on the right side of FIG. 24 has a planar layout that is line-symmetrical in the left-right direction (row direction) of FIG. 24. In the left-right direction (row direction) of FIG. 24, the photodiode 51b is arranged in the center, and the transfer transistors 61b and 62b, the charge storage units 52b and 53b, and the conversion efficiency adjustment transistors 63b and 64b are arranged so as to sandwich the photodiode 51b. In the vertical direction (column direction) of FIG. 24, the selection transistors 65b and 66b and the amplification transistors 67b and 68b are arranged above the photodiode 51b. A discharge transistor 60b and reset transistors 69b and 70b are arranged below the photodiode 51b.

According to the distance measuring device according to the eighth embodiment, the transfer transistors 61a and 62a and the like may be arranged so as to sandwich the photodiodes 51a and 51b, and the planar layout of the pixels 40a and the pixels 40b on the semiconductor substrate 50 is not particularly limited.

Ninth Embodiment

The distance measuring device according to the ninth embodiment is the same as that of the distance measuring device according to the first embodiment in that it has the planar layout of the pixels 40a and 40b on the semiconductor substrate 50 shown in FIG. 4, but is different in that the configuration of the wiring layer located on the planar layout on the semiconductor substrate 50 is different from that the distance measuring device according to the first embodiment shown in FIGS. 5 and 6.

Figure 25:
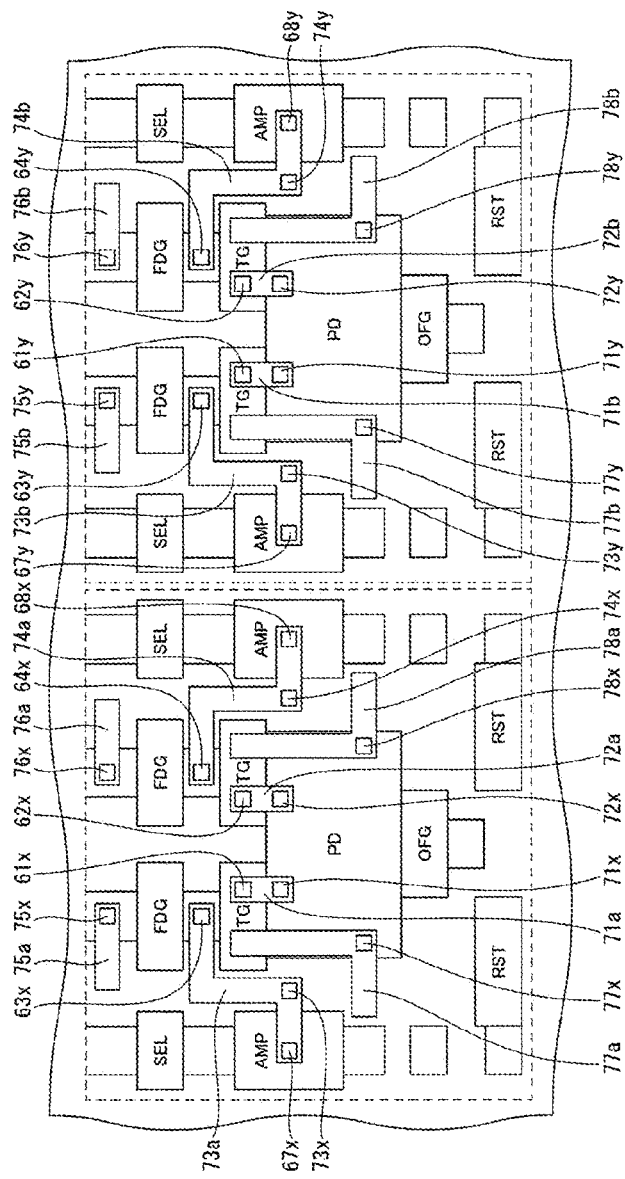
FIG. 25 is a plan view of a semiconductor substrate and a lower-layer wiring layer of pixels according to a ninth embodiment.
Figure 26:
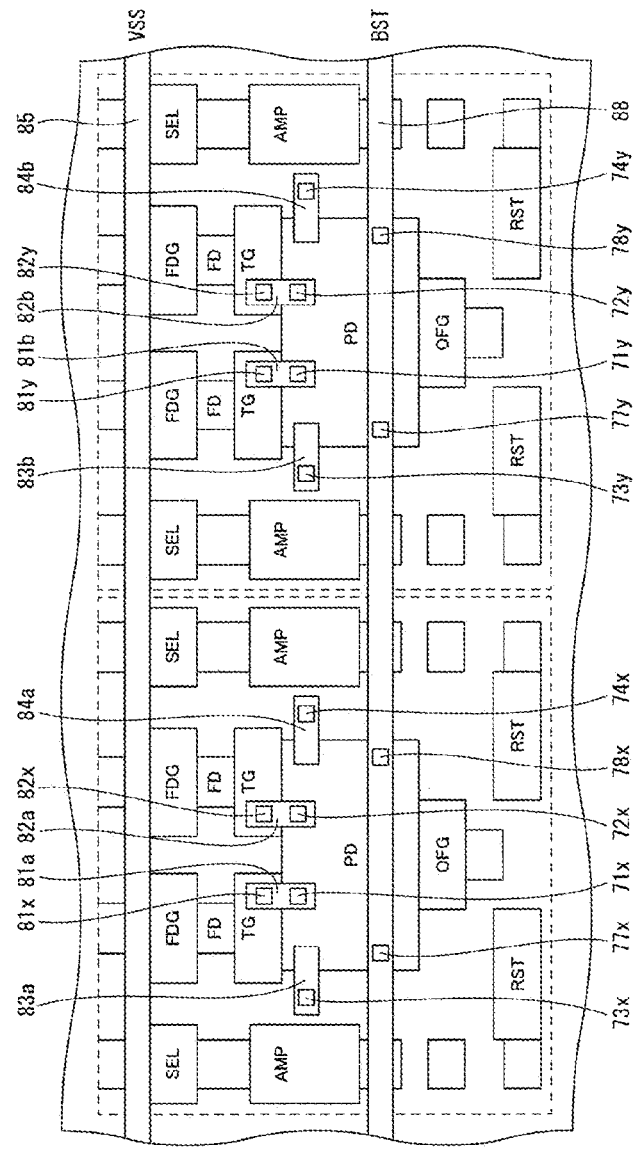
FIG. 26 is a plan view of a semiconductor substrate and an upper-layer wiring layer of pixels according to the ninth embodiment.

FIG. 25 shows the planar layout of the wiring layer (lower-layer wiring layer) which is the lowest layer of the multilayer wiring structure on the semiconductor substrate 50 so as to be superimposed on the planar layout on the semiconductor substrate 50 shown in FIG. 4. FIG. 26 shows the planar layout of the wiring layer (upper-layer wiring layer) which is an upper layer of the lower-layer wiring layer so as to be superimposed on the layout on the semiconductor substrate 50 shown in FIG. 4.

Note that, in FIGS. 25 and 26, only the wirings of interest among the wirings existing in the lower-layer wiring layer and the upper-layer wiring layer is shown, and some of the wirings existing in the lower-layer wiring layer and the upper-layer wiring layer are omitted. In FIGS. 25 and 26, only the wirings existing in the lower-layer wiring layer and the upper-layer wiring layer are designated for ease of viewing. The wirings except for the wirings existing in the lower-layer wiring layer and the upper-layer wiring layer in FIGS. 25 and 26 will be described with reference to the reference numerals shown in FIG. 4.

In the pixel 40a on the left side of FIG. 25, the lower-layer wiring layer includes the lower-layer wirings 71a, 72a, 73a, and 74a. The lower-layer wiring 71a is connected to the gate electrode of the transfer transistor 61a via the lower-layer via 61x. The lower-layer wiring 72a is connected to the gate electrode of the transfer transistor 62a via the lower-layer via 62x. The lower-layer wiring 73a is connected to the charge storage unit 52a via the lower-layer via 63x, and is connected to the gate electrode of the amplification transistor 67a via the lower-layer via 67x. The lower-layer wiring 74a is connected to the charge storage unit 53a via the lower-layer via 64x, and is connected to the gate electrode of the amplification transistor 68a via the lower-layer via 68x.

The lower-layer wiring layer includes lower-layer wirings 75a and 76a. The lower-layer wirings 75a and 76a are floating wirings for adding capacitance. The lower-layer wirings 75a and 76a have, for example, a linear planar pattern, but the planar pattern shape is not particularly limited. The lower-layer wiring 75a is adjacent to and parallel to a portion of the lower-layer wiring 73a, and is capacitively coupled to the lower-layer wiring 73a. The lower-layer wiring 75a is connected to the drain (additional capacitance portion) 54a of the conversion efficiency adjustment transistor 63a via the lower-layer via 75x. The lower-layer wiring 76a is adjacent to and parallel to a portion of the lower-layer wiring 74a, and is capacitively coupled to the lower-layer wiring 74a. The lower-layer wiring 76a is connected to the drain (additional capacitance portion) 55a of the conversion efficiency adjustment transistor 64a via the lower-layer via 76x.

The lower-layer wiring layer includes lower-layer wirings 77a and 78a. The lower-layer wirings 77a and 78a constitute a portion of the boost wiring for adding capacitance. The lower-layer wirings 77a and 78a have, for example, an L-shaped planar pattern, but the planar pattern shape is not particularly limited. The lower-layer wiring 77a is adjacent to and parallel to a portion of the L-shape of the lower-layer wiring 73a, and is capacitively coupled to the lower-layer wiring 73a. The lower-layer wiring 78a is adjacent to and parallel to a portion of the L-shape of the lower-layer wiring 74a, and is capacitively coupled to the lower-layer wiring 74a. In the pixel 40a on the left side of FIG. 25, the lower-layer wirings 71a, 72a, 73a, 74a, 75a, 76a, 77a, and 78a constituting the lower-layer wiring layer have a layout that is line-symmetrical in the left-right direction with respect to the center position of the photodiode 51a.

In the pixel 40b on the right side of FIG. 25, the lower-layer wiring layer includes the lower-layer wirings 71b, 72b, 73b, and 74b. The lower-layer wiring 71b is connected to the gate electrode of the transfer transistor 61b via the lower-layer via 61y. The lower-layer wiring 72b is connected to the gate electrode of the transfer transistor 62b via the lower-layer via 62y. The lower-layer wiring 73b is connected to the charge storage unit 52b via the lower-layer via 63y, and is connected to the gate electrode of the amplification transistor 67b via the lower-layer via 67y. The lower-layer wiring 74b is connected to the charge storage unit 53b via the lower-layer via 64y, and is connected to the gate electrode of the amplification transistor 68b via the lower-layer via 68y.

The lower-layer wiring layer includes lower-layer wirings 75b and 76b. The lower-layer wirings 75b and 76b are floating wirings for adding capacitance. The lower-layer wirings 75b and 76b have, for example, a linear planar pattern, but the planar pattern shape is not particularly limited. The lower-layer wiring 75b is adjacent to and parallel to a portion of the lower-layer wiring 73b, and is capacitively coupled to the lower-layer wiring 73b. The lower-layer wiring 75b is connected to the drain (additional capacitance portion) 54b of the conversion efficiency adjustment transistor 63b via the lower-layer via 75y. The lower-layer wiring 76b is adjacent to and parallel to a portion of the lower-layer wiring 74b, and is capacitively coupled to the lower-layer wiring 74b. The lower-layer wiring 76b is connected to the drain (additional capacitance portion) 55b of the conversion efficiency adjustment transistor 64b via the lower-layer via 76y.

The lower-layer wiring layer includes lower-layer wirings 77b and 78b. The lower-layer wirings 77b and 78b constitute a portion of the boost wiring for adding capacitance. The lower-layer wirings 77b and 78b have, for example, an L-shaped planar pattern, but the planar pattern shape is not particularly limited. The lower-layer wiring 77b is adjacent to and parallel to a portion of the L-shape of the lower-layer wiring 73b, and is capacitively coupled to the lower-layer wiring 73b. The lower-layer wiring 78b is adjacent to and parallel to a portion of the L-shape of the lower-layer wiring 74b, and is capacitively coupled to the lower-layer wiring 74b. In the pixel 40b on the right side of FIG. 25, the lower-layer wirings 71b, 72b, 73b, 74b, 75b, 76b, 77b, and 78b constituting the lower-layer wiring layer have a layout that is line-symmetrical in the left-right direction with respect to the center position of the photodiode 51b.

As shown in FIG. 26, the upper-layer wiring layer includes a reference potential wiring 85 and a boost wiring 88. The reference potential wiring 85 and the boost wiring 88 are arranged so as to extend in the left-right direction (row direction) of FIG. 26. The boost wiring 88 is electrically connected to the lower-layer wirings 77a and 78a shown in FIG. 25 via the upper-layer vias 77x and 78x. The boost wiring 88 is electrically connected to the lower-layer wirings 77b and 78b shown in FIG. 25 via the upper-layer vias 77y and 78y. That is, the boost wiring is constituted by the boost wiring 88 of the upper-layer wiring layer, the upper-layer vias 77x, 77y, 78x, and 78y, and the lower-layer wirings 77a, 77b, 78a, and 78b of the lower-layer wiring layer, and the boost wirings (77a, 77b, 77x, 77y, 78a, 78b, 78x, 78y, and 88) extend to the lower-layer wiring layer.

As shown in FIG. 26, the upper-layer wiring layer further includes the upper-layer wirings 81a and 82a on the pixel 40a side and the upper-layer wirings 81b and 82b on the pixel 40b side. The upper-layer wirings 81a and 82a are connected to the lower-layer wirings 71a and 72a shown in FIG. 25 via the upper-layer vias 71x and 72x. The upper-layer wirings 81a and 82a are electrically connected to the transfer control wiring (not shown) arranged in the wiring layer further above the upper-layer wiring layer via the vias 81x and 82x. The upper-layer wirings 81b and 82b are connected to the lower-layer wirings 71b and 72b shown in FIG. 25 via the upper-layer vias 71y and 72y. The upper-layer wirings 81b and 82b are electrically connected to the transfer control wiring (not shown) arranged in the wiring layer further above the upper-layer wiring layer via the vias 81y and 82y.

As shown in FIG. 26, the upper-layer wiring layer further includes the upper-layer wirings 83a and 84a on the pixel 40a side and the upper-layer wirings 83b and 84b on the pixel 40b side. The upper-layer wiring 83a is connected to the lower-layer wiring 73a shown in FIG. 25 via the upper-layer via 73x. The upper-layer wiring 84a is connected to the lower-layer wiring 74a shown in FIG. 25 via the upper-layer via 74x. The upper-layer wiring 83b is connected to the lower-layer wiring 73b shown in FIG. 25 via the upper-layer via 73y. The upper-layer wiring 84b is connected to the lower-layer wiring 74b shown in FIG. 25 via the upper-layer via 74y.

That is, the lower-layer vias 63x, 67x, the lower-layer wiring 73a, the upper-layer via 73x, and the upper-layer wiring 83a constitute the connection wirings (63x, 67x, 73a, 73x, and 83a) connected between the charge storage unit 52a and the gate electrode of the amplification transistor 67a. The connection wirings (63x, 67x, 73a, 73x, and 83a) connect the charge storage unit 52a and the gate electrode of the amplification transistor 67a in the lower-layer wiring layer, but the upper-layer wiring 83a which is a portion of the connection wirings (63x, 67x, 73a, 73x, and 83a) extends to the upper-layer wiring layer.

The lower-layer vias 64x and 68x, the lower-layer wiring 74a, the upper-layer via 74x, and the upper-layer wiring 84a constitute the connection wirings (64x, 68x, 74a, 74x, and 84a) connected between the charge storage unit 53a and the gate electrode of the amplification transistor 68a. The connection wirings (64x, 68x, 74a, 74x, and 84a) connect the charge storage unit 53a and the gate electrode of the amplification transistor 68a in the lower-layer wiring layer, but the upper-layer wiring 84a which is a portion of the connection wirings (64x, 68x, 74a, 74x, and 84a) extends to the upper-layer wiring layer.

The lower-layer vias 63y, 67y, the lower-layer wiring 73b, the upper-layer via 73y, and the upper-layer wiring 83b constitute the connection wirings (63y, 67y, 73b, 73y, and 83b) connected between the charge storage unit 52b and the gate electrode of the amplification transistor 67b. The connection wirings (63y, 67y, 73b, 73y, and 83b) connect the charge storage unit 53b and the gate electrode of the amplification transistor 68b in the lower-layer wiring layer, but the upper-layer wiring 83b which is a portion of the connection wirings (63y, 67y, 73b, 73y, and 83b) extends to the upper-layer wiring layer.

The lower-layer via 64y and 68y, the lower-layer wiring 74b, the upper-layer via 74y, and the upper-layer wiring 84b constitute the connection wirings (64y, 68y, 74b, 74y, and 84b) connected between the charge storage unit 53b and the gate electrode of the amplification transistor 68b. The connection wirings (64y, 68y, 74b, 74y, and 84b) connect the charge storage unit 53b and the gate electrode of the amplification transistor 68b in the lower-layer wiring layer, but the upper-layer wiring 84b which is a portion of the connection wirings (64y, 68y, 74b, 74y, and 84b) extends to the upper-layer wiring layer.

The upper-layer wirings 83a, 83b, 84a, and 84b are adjacent to the boost wiring 88 and are arranged so as to extend in parallel with the boost wiring 88, and are capacitively coupled to the boost wiring 88. The boost wiring 88 boosts the potentials of the charge storage units 52a, 52b, 53a, and 53b electrically connected to the upper-layer wirings 83a, 83b, 84a, and 84b during the charge storage period (charge distribution period) of the charge storage units 52a, 52b, 53a, and 53b. Further, each of the upper-layer wirings 83a, 83b, 84a, and 84b is also capacitively coupled to each of the upper-layer wirings 81a, 81b, 82a, and 82b.

Since the other configuration of the distance measuring device according to the ninth embodiment is the same as that of the distance measuring device according to the first embodiment, duplicated description will be omitted. Since the distance measuring method according to the ninth embodiment is the same as the distance measuring method according to the fourth embodiment shown in the timing chart of FIG. 17, duplicated description will be omitted.

According to the distance measuring device according to the ninth embodiment, in the upper-layer wiring layer, the upper-layer wirings 83a, 83b, 84a, and 84b and the boost wiring 88 are arranged in the same wiring layer, so that the upper-layer wirings 83a, 83b, 84a, and 84b and the boost wiring 88 can be capacitively coupled, and the charge storage units 52a, 52b, 53a, and 53b can be boosted. The boost wirings (77a, 77b, 77x, 77y, 78a, 78b, 78x, 78y, and 88) can be extended to the lower-layer wiring layer, the lower-layer wiring 77a, 77b, 78a, and 78b and the lower-layer wiring 73a, 73b, 74a, and 74b can be capacitively coupled, and the charge storage units 52a, 52b, 53a, and 53b can be boosted.

The timing of boosting the charge storage units 52a, 52b, 53a, and 53b can be controlled by the voltage application timing of the boost wiring 88.

The lower-layer wirings 71a, 72a, 73a, 74a, 75a, 76a, 77a, 78a constituting the lower-layer wiring layer on the pixel 40a side, and the lower-layer wirings 71b, 72b, 73b, 74b, 75b, 76b, 77b, and 78b constituting the lower-layer wiring layer on the pixel 40b side are arranged in a layout that is line-symmetrical in the left-right direction with respect to the center position of the photodiodes 51a and 51b, so that the variation resistance and the capacitance of the charge storage units 52a, 52b, 53a, and 53b can be made uniform.

Tenth Embodiment

Figure 27:
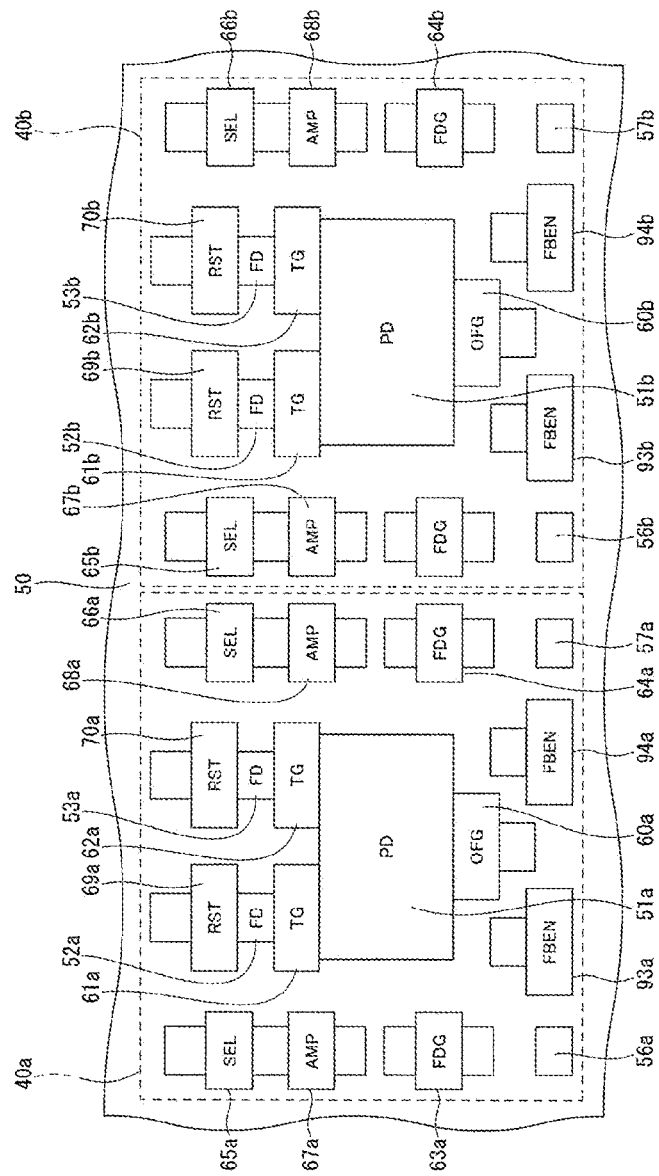
FIG. 27 is a plan view of a semiconductor substrate of pixels according to a tenth embodiment.

As shown in FIG. 27, in the distance measuring device according to the tenth embodiment, a planar layout of the pixels 40a and 40b on the semiconductor substrate 50 is different from that of the distance measuring device according to the first embodiment shown in FIG. 4.

The pixel 40a on the left side of FIG. 27 has a planar layout that is line-symmetrical in the left-right direction (row direction) of FIG. 27. In the vertical direction (column direction) of FIG. 27, transfer transistors 61a and 62a, charge storage units 52a and 53a, and reset transistors 69a and 70a are arranged above the photodiode 51a. A discharge transistor 60a is arranged below the photodiode 51a. Further, transistors 93a and 93a for executing the kTC cancellation drive are arranged below the photodiode 51a.

In the left-right direction (row direction) of FIG. 27, the selection transistors 65a and 66a, the amplification transistors 67a and 68a, the conversion efficiency adjustment transistors 63a and 64a, and the well contacts 56a and 57a are arranged so as to sandwich the photodiode 51a.

The pixel 40b on the right side of FIG. 27 has a planar layout that is line-symmetrical in the left-right direction (row direction) of FIG. 27. In the vertical direction (column direction) of FIG. 27, transfer transistors 61b and 62b, charge storage units 52b and 53b, and reset transistors 69b and 70b are arranged above the photodiode 51b. A discharge transistor 60b is arranged below the photodiode 51b. Further, transistors 93b and 94b for executing kTC cancellation drive are arranged below the photodiode 51b.

In the left-right direction (row direction) of FIG. 27, the selection transistors 65b and 66b, the amplification transistors 67b and 68b, the conversion efficiency adjustment transistors 63b and 64b, and the well contacts 56b and 57b are arranged so as to sandwich the photodiode 51b.

Figure 28:
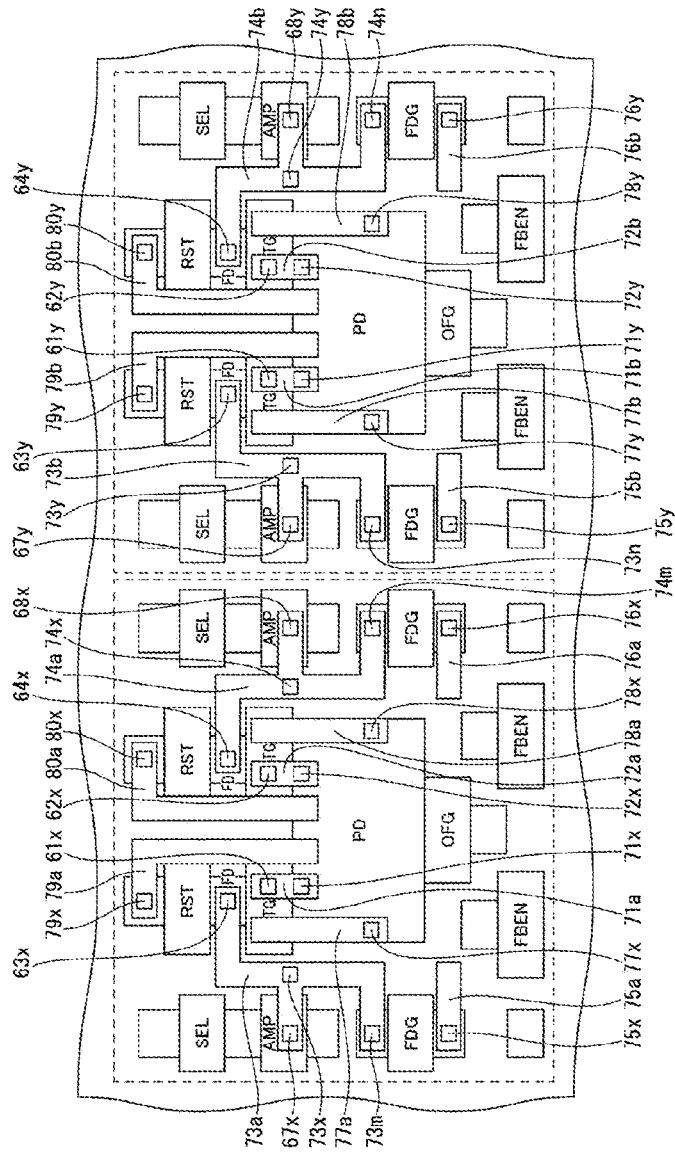
FIG. 28 is a plan view of a semiconductor substrate and a lower-layer wiring layer of pixels according to the tenth embodiment.
Figure 29:
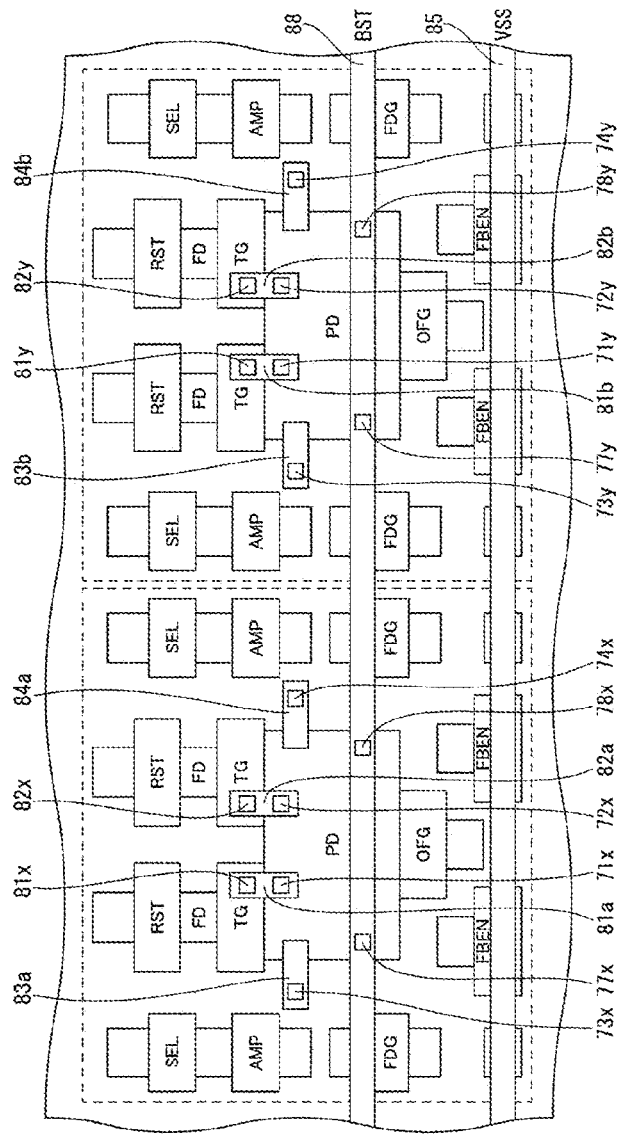
FIG. 29 is a plan view of a semiconductor substrate and an upper-layer wiring layer of pixels according to a tenth embodiment.

FIG. 28 shows the planar layout of the wiring layer (lower-layer wiring layer) which is the lowest layer of the multilayer wiring structure on the semiconductor substrate 50 so as to be superimposed on the planar layout on the semiconductor substrate 50 shown in FIG. 27. FIG. 29 shows the planar layout of the wiring layer (upper-layer wiring layer) which is an upper layer of the lower-layer wiring layer so as to be superimposed on the layout on the semiconductor substrate 50 shown in FIG. 27.

Note that, in FIGS. 28 and 29, only the wirings of interest among the wirings existing in the lower-layer wiring layer and the upper-layer wiring layer is shown, and some of the wirings existing in the lower-layer wiring layer and the upper-layer wiring layer are omitted. In FIGS. 28 and 29, only the wirings existing in the lower-layer wiring layer and the upper-layer wiring layer are designated for ease of viewing. The wirings except for the wirings existing in the lower-layer wiring layer and the upper-layer wiring layer in FIGS. 28 and 29 will be described with reference to the reference numerals shown in FIG. 27.

In the pixel 40a on the left side of FIG. 28, the lower-layer wiring layer includes the lower-layer wirings 71a, 72a, 73a, and 74a. The lower-layer wiring 71a is connected to the gate electrode of the transfer transistor 61a via the lower-layer via 61x. The lower-layer wiring 72a is connected to the gate electrode of the transfer transistor 62a via the lower-layer via 62x. The lower-layer wiring 73a is connected to the charge storage unit 52a via the lower-layer via 63x, connected to the gate electrode of the amplification transistor 67a via the lower-layer via 67x, and connected to the source of the conversion efficiency adjustment transistor 63a via the lower-layer via 73m. The lower-layer wiring 74a is connected to the charge storage unit 53a via the lower-layer via 64x, connected to the gate electrode of the amplification transistor 68a via the lower-layer via 68x, and connected to the source of the conversion efficiency adjustment transistor 64a via the lower-layer via 74m.

The lower-layer wiring layer includes lower-layer wirings 75a and 76a. The lower-layer wirings 75a and 76a are floating wirings for adding capacitance. The lower-layer wirings 75a and 76a have, for example, a linear planar pattern, but the planar pattern shape is not particularly limited. The lower-layer wiring 75a is adjacent to and parallel to a portion of the lower-layer wiring 73a, and is capacitively coupled to the lower-layer wiring 73a. The lower-layer wiring 75a is connected to the drain of the conversion efficiency adjustment transistor 63a via the lower-layer via 75x. The lower-layer wiring 76a is adjacent to and parallel to a portion of the lower-layer wiring 74a, and is capacitively coupled to the lower-layer wiring 74a. The lower-layer wiring 76a is connected to the drain of the conversion efficiency adjustment transistor 64a via the lower-layer via 76x.

The lower-layer wiring layer includes lower-layer wirings 77a and 78a. The lower-layer wirings 77a and 78a constitute a portion of the boost wiring for adding capacitance. The lower-layer wirings 77a and 78a have, for example, a linear planar pattern, but the planar pattern shape is not particularly limited. The lower-layer wiring 77a is adjacent to and parallel to a portion of the lower-layer wiring 73a, and is capacitively coupled to the lower-layer wiring 73a. The lower-layer wiring 78a is adjacent to and parallel to a portion of the lower-layer wiring 74a, and is capacitively coupled to the lower-layer wiring 74a.

The lower-layer wiring layer includes lower-layer wirings 79a and 80a. The lower-layer wirings 79a and 80a are kTC cancellation wirings for adding capacitance when the transistors 93a and 94a execute the kTC cancellation drive. The lower-layer wirings 79a and 80a have, for example, an L-shaped planar pattern, but the planar pattern shape is not particularly limited. The lower-layer wiring 79a is connected to the drain of the reset transistor 69a via the lower-layer via 79x. The lower-layer wiring 80a is connected to the drain of the reset transistor 70a via the lower-layer via 80x. In the pixel 40a on the left side of FIG. 28, the lower-layer wirings 71a, 72a, 73a, 74a, 75a, 76a, 77a, 78a, 79a, and 80a constituting the lower-layer wiring layer are arranged in a layout that is line-symmetrical in the left-right direction with respect to the center position of the photodiode 51a.

In the pixel 40b on the right side of FIG. 28, the lower-layer wiring layer includes the lower-layer wirings 71b, 72b, 73b, and 74b. The lower-layer wiring 71b is connected to the gate electrode of the transfer transistor 61b via the lower-layer via 61y. The lower-layer wiring 72b is connected to the gate electrode of the transfer transistor 62b via the lower-layer via 62y. The lower-layer wiring 73b is connected to the charge storage unit 52b via the lower-layer via 63y, connected to the gate electrode of the amplification transistor 67b via the lower-layer via 67y, and connected to the source of the conversion efficiency adjustment transistor 63b via the lower-layer via 73n. The lower-layer wiring 74b is connected to the charge storage unit 53*b* via the lower-layer via 64*y*, connected to the gate electrode of the amplification transistor 68*b* via the lower-layer via 68*y*, and connected to the source of the conversion efficiency adjustment transistor 64*b* via the lower-layer via 74*n*.

The lower-layer wiring layer includes lower-layer wirings 75*b* and 76*b*. The lower-layer wirings 75*b* and 76*b* are floating wirings for adding capacitance. The lower-layer wirings 75*b* and 76*b* have, for example, a linear planar pattern, but the planar pattern shape is not particularly limited. The lower-layer wiring 75*b* is adjacent to and parallel to a portion of the lower-layer wiring 73*b*, and is capacitively coupled to the lower-layer wiring 73*b*. The lower-layer wiring 75*b* is connected to the drain of the conversion efficiency adjustment transistor 63*b* via the lower-layer via 75*y*. The lower-layer wiring 76*b* is adjacent to and parallel to a portion of the lower-layer wiring 74*b*, and is capacitively coupled to the lower-layer wiring 74*b*. The lower-layer wiring 76*b* is connected to the drain of the conversion efficiency adjustment transistor 64*b* via the lower-layer via 76*y*.

The lower-layer wiring layer includes lower-layer wirings 77*b* and 78*b*. The lower-layer wirings 77*b* and 78*b* constitute a portion of the boost wiring for adding capacitance. The lower-layer wirings 77*b* and 78*b* have, for example, a linear planar pattern, but the planar pattern shape is not particularly limited. The lower-layer wiring 77*b* is adjacent to and parallel to a portion of the lower-layer wiring 73*b*, and is capacitively coupled to the lower-layer wiring 73*b*. The lower-layer wiring 78*b* is adjacent to and parallel to a portion of the lower-layer wiring 74*b*, and is capacitively coupled to the lower-layer wiring 74*b*.

The lower-layer wiring layer includes lower-layer wirings 79*b* and 80*b*. The lower-layer wirings 79*b* and 80*b* are kTC cancellation wirings for adding a capacitance when the transistors 93*b* and 94*b* execute the kTC cancellation drive. The lower-layer wirings 79*b* and 80*b* have, for example, an L-shaped planar pattern, but the planar pattern shape is not particularly limited. The lower-layer wiring 79*b* is connected to the drain of the reset transistor 69*b* via the lower-layer via 79*y*. The lower-layer wiring 80*b* is connected to the drain of the reset transistor 70*b* via the lower-layer via 80*y*. In the pixel 40*b* on the left side of FIG. 28, the lower-layer wirings 71*b*, 72*b*, 73*b*, 74*b*, 75*b*, 76*b*, 77*b*, 78*b*, 79*b*, and 80*b* constituting the lower-layer wiring layer are arranged in a layout that is line-symmetrical in the left-right direction with respect to the center position of the photodiode 51*b*.

As shown in FIG. 29, the upper-layer wiring layer includes a reference potential wiring 85 and a boost wiring 88. The reference potential wiring 85 and the boost wiring 88 are arranged so as to extend in the left-right direction (row direction) of FIG. 29. The boost wiring 88 is electrically connected to the lower-layer wirings 77*a* and 78*a* shown in FIG. 25 via the upper-layer vias 77*x* and 78*x*. The boost wiring 88 is electrically connected to the lower-layer wirings 77*b* and 78*b* shown in FIG. 25 via the upper-layer vias 77*y* and 78*y*. That is, the boost wirings (77*a*, 77*b*, 77*x*, 77*y*, 78*a*, 78*b*, 78*x*, 78*y*, and 88) extend to the lower-layer wiring layer.

As shown in FIG. 29, the upper-layer wiring layer further includes the upper-layer wirings 81*a* and 82*a* on the pixel 40*a* side and the upper-layer wirings 81*b* and 82*b* on the pixel 40*b* side. The upper-layer wirings 81*a* and 82*a* are connected to the lower-layer wirings 71*a* and 72*a* shown in FIG. 28 via the upper-layer vias 71*x* and 72*x*. The upper-layer wirings 81*a* and 82*a* are electrically connected to the transfer control wiring (not shown) arranged in the wiring layer further above the upper-layer wiring layer via the vias 81*x* and 82*x*. The upper-layer wirings 81*b* and 82*b* are connected to the lower-layer wirings 71*b* and 72*b* shown in FIG. 28 via the upper-layer vias 71*y* and 72*y*. The upper-layer wirings 81*b* and 82*b* are electrically connected to the transfer control wiring (not shown) arranged in the wiring layer further above the upper-layer wiring layer via the vias 81*y* and 82*y*.

As shown in FIG. 29, the upper-layer wiring layer further includes the upper-layer wirings 83*a* and 84*a* on the pixel 40*a* side and the upper-layer wirings 83*b* and 84*b* on the pixel 40*b* side. The upper-layer wiring 83*a* is connected to the lower-layer wiring 73*a* shown in FIG. 28 via the upper-layer via 73*x*. The upper-layer wiring 84*a* is connected to the lower-layer wiring 74*a* shown in FIG. 28 via the upper-layer via 74*x*. The upper-layer wiring 83*b* is connected to the lower-layer wiring 73*b* shown in FIG. 28 via the upper-layer via 73*y*. The upper-layer wiring 84*b* is connected to the lower-layer wiring 74*b* shown in FIG. 28 via the upper-layer via 74*y*.

In the tenth embodiment, as in the ninth embodiment, the connection wirings (63*x*, 67*x*, 73*a*, 73*x*, and 83*a*) connect the charge storage unit 52*a* and the gate electrode of the amplification transistor 67*a* in the lower-layer wiring layer, but the upper-layer wiring 83*a* which is a portion of the connection wirings (63*x*, 67*x*, 73*a*, 73*x*, and 83*a*) extends to the upper-layer wiring layer. The connection wirings (64*x*, 68*x*, 74*a*, 74*x*, and 84*a*) connect the charge storage unit 53*a* and the gate electrode of the amplification transistor 68*a* in the lower-layer wiring layer, but the upper-layer wiring 84*a* which is a portion of the connection wirings (64*x*, 68*x*, 74*a*, 74*x*, and 84*a*) extends to the upper-layer wiring layer. The connection wirings (63*y*, 67*y*, 73*b*, 73*y*, and 83*b*) connect the charge storage unit 53*b* and the gate electrode of the amplification transistor 68*b* in the lower-layer wiring layer, but the upper-layer wiring 83*b* which is a portion of the connection wirings (63*y*, 67*y*, 73*b*, 73*y*, and 83*b*) extends to the upper-layer wiring layer. The connection wirings (64*y*, 68*y*, 74*b*, 74*y*, and 84*b*) connect the charge storage unit 53*b* and the gate electrode of the amplification transistor 68*b* in the lower-layer wiring layer, but the upper-layer wiring 84*b* which is a portion of the connection wirings (64*y*, 68*y*, 74*b*, 74*y*, and 84*b*) extends to the upper-layer wiring layer.

The upper-layer wirings 83*a*, 83*b*, 84*a*, and 84*b* are adjacent to the boost wiring 88 and are arranged so as to extend in parallel with the boost wiring 88, and are capacitively coupled to the boost wiring 88. The boost wiring 88 boosts the potentials of the charge storage units 52*a*, 52*b*, 53*a*, and 53*b* electrically connected to the upper-layer wirings 83*a*, 83*b*, 84*a*, and 84*b* during the charge storage period (charge distribution period) of the charge storage units 52*a*, 52*b*, 53*a*, and 53*b*. Further, each of the upper-layer wirings 83*a*, 83*b*, 84*a*, and 84*b* is also capacitively coupled to each of the upper-layer wirings 81*a*, 81*b*, 82*a*, and 82*b*.

Since the other configuration of the distance measuring device according to the tenth embodiment is the same as that of the distance measuring device according to the first embodiment, duplicated description will be omitted. Since the distance measuring method according to the tenth embodiment is the same as the distance measuring method according to the fourth embodiment shown in the timing chart of FIG. 17, duplicated description will be omitted.

According to the distance measuring device according to the tenth embodiment, in the upper-layer wiring layer, the upper-layer wirings 83*a*, 83*b*, 84*a*, and 84*b* and the boost wiring 88 are arranged in the same wiring layer, so that the upper-layer wirings 83a, 83b, 84a, and 84b and the boost wiring 88 can be capacitively coupled, and the charge storage units 52a, 52b, 53a, and 53b can be boosted. The boost wirings (77a, 77b, 77x, 77y, 78a, 78b, 78x, 78y, and 88) can be extended to the lower-layer wiring layer, the lower-layer wiring 77a, 77b, 78a, and 78b and the lower-layer wiring 73a, 73b, 74a, and 74b can be capacitively coupled, and the charge storage units 52a, 52b, 53a, and 53b can be boosted.

The timing of boosting the charge storage units 52a, 52b, 53a, and 53b can be controlled by the voltage application timing of the boost wiring 88.

The lower-layer wirings 71a, 72a, 73a, 74a, 75a, 76a, 77a, 78a, 79a, and 80a constituting the lower-layer wiring layer on the pixel 40a side, and the lower-layer wirings 71b, 72b, 73b, 74b, 75b, 76b, 77b, 78b, 78b, and 79b constituting the lower-layer wiring layer on the pixel 40b side are arranged in a layout that is line-symmetrical in the left-right direction with respect to the center position of the photodiodes 51a and 51b, so that the variation resistance and the capacitance of the charge storage units 52a, 52b, 53a, and 53b can be made uniform.

Other Embodiments

As described above, the present technology has been described by way of the first to tenth embodiments, but the discussion and drawings that form a part of this disclosure are not to be understood as limiting the technology. Understanding the gist of the technical content disclosed in the above embodiments will make it clear to those skilled in the art that various alternative embodiments, examples and operating techniques may be included in the present technology. In addition, the configurations disclosed in the first to tenth embodiments and their modifications can be appropriately combined within a range where there is no contradiction. For example, configurations disclosed in a plurality of different embodiments may be combined, or configurations disclosed in a plurality of different modifications of the same embodiment may be combined.

Example of Application in Mobile Object

The technique according to the present disclosure (the present technology) can be applied in various products. For example, the technology of the present disclosure may be implemented as a device mounted in any type of mobile object such as an automobile, an electric automobile, a motorbike, a hybrid electric automobile, a bicycle, a personal mobility, an airplane, a drone, a ship, and a robot.

Figure 30:
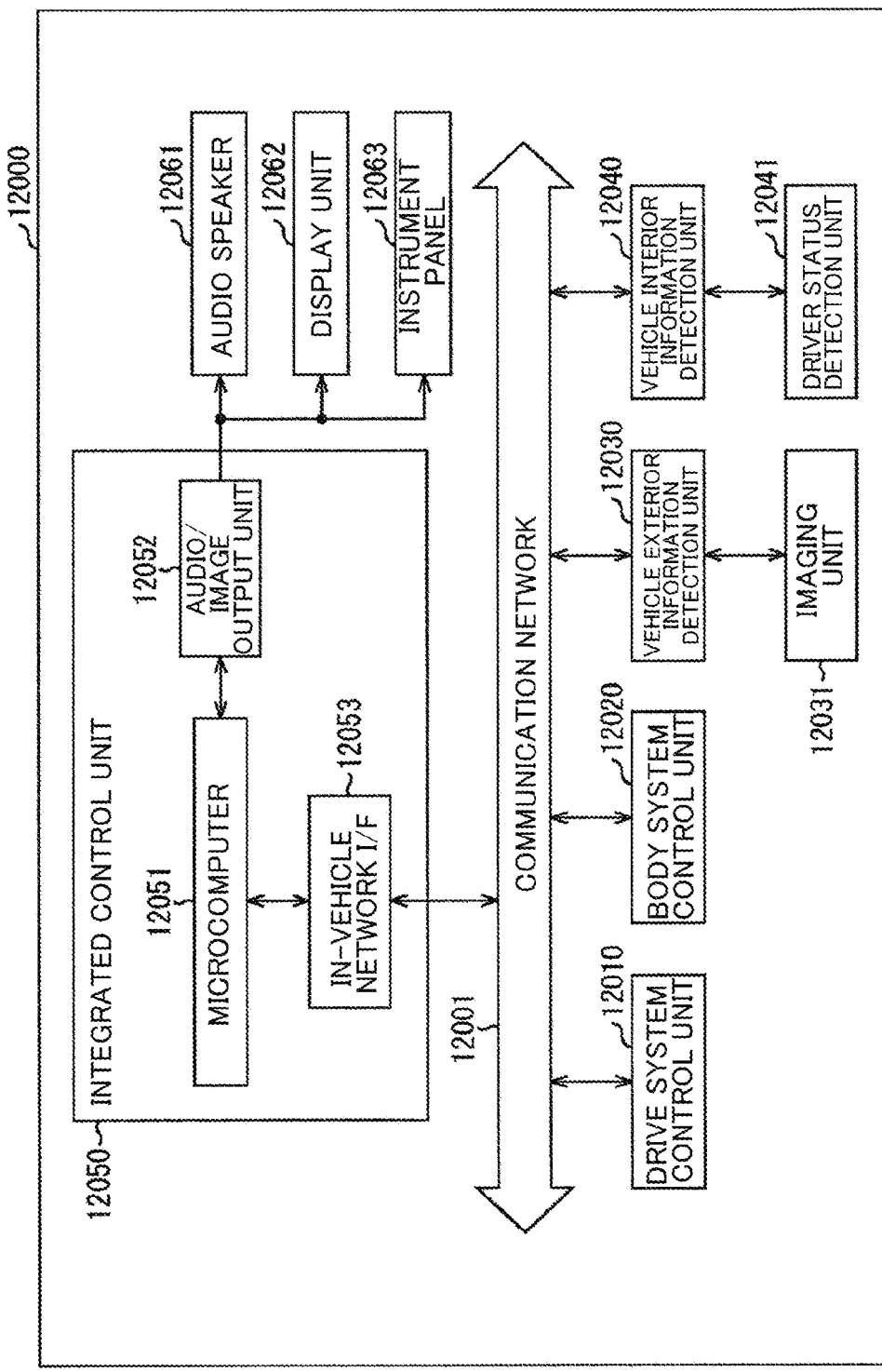
FIG. 30 is a block diagram showing an example of a schematic configuration of a vehicle control system.

FIG. 30 is a block diagram showing a schematic configuration example of a vehicle control system that is an example of a mobile object control system to which the technology according to the present disclosure can be applied.

A vehicle control system 12000 includes a plurality of electronic control units connected to each other through a communication network 12001. In an example illustrated in FIG. 30, the vehicle control system 12000 includes a drive system control unit 12010, a body system control unit 12020, a vehicle exterior information detection unit 12030, a vehicle interior information detection unit 12040, and an integrated control unit 12050. A microcomputer 12051, an audio/image output unit 12052, and an in-vehicle network interface (I/F) 12053 are illustrated as a functional configuration of the integrated control unit 12050.

The drive system control unit 12010 controls operations of devices related to a drive system of a vehicle according to various programs. For example, the drive system control unit 12010 functions as a control device for a driving force generating device for generating a driving force of a vehicle such as an internal combustion engine or a drive motor, a driving force transmission mechanism for transmitting a driving force to wheels, a steering mechanism for adjusting a steering angle of a vehicle, and a braking device for generating a braking force of a vehicle.

The body system control unit 12020 controls operations of various devices mounted in the vehicle body according to various programs. For example, the body system control unit 12020 functions as a control device of a keyless entry system, a smart key system, a power window device, or various lamps such as a head lamp, a back lamp, a brake lamp, a turn signal, or a fog lamp. In this case, radio waves transmitted from a portable device that substitutes for a key or signals of various switches may be input to the body system control unit 12020. The body system control unit 12020 receives such a radio wave or signal input, and controls a door lock device, a power window device, and a lamp of the vehicle.

The vehicle exterior information detection unit 12030 detects information outside the vehicle in which the vehicle control system 12000 is mounted. For example, an imaging unit 12031 is connected to the vehicle exterior information detection unit 12030. The vehicle exterior information detection unit 12030 causes the imaging unit 12031 to capture an image of the outside of the vehicle and receives the captured image. The vehicle exterior information detection unit 12030 may perform object detection processing or distance detection processing for peoples, cars, obstacles, signs, and letters on the road based on the received image.

The imaging unit 12031 is an optical sensor that receives light and outputs an electrical signal according to the intensity of the light received. The imaging unit 12031 can output an electrical signal as an image or output it as a distance measurement information. The light received by the imaging unit 12031 may be visible light or invisible light such as infrared light.

The vehicle interior information detection unit 12040 detects information on the interior of the vehicle. In the vehicle interior information detection unit 12040, for example, a driver status detection unit 12041 that detects the driver's status is connected. The driver status detection unit 12041 includes, for example, a camera that images the driver, and the vehicle interior information detection unit 12040 may calculate the degree of fatigue or degree of concentration of the driver based on detection information input from the driver status detection unit 12041, and may determine whether the driver is asleep.

The microcomputer 12051 can calculate a control target value of the driving force generation device, the steering mechanism, or the braking device on the basis of the information inside and outside the vehicle acquired by the vehicle exterior information detection unit 12030 or the vehicle interior information detection unit 12040, and output a control command to the drive system control unit 12010. For example, the microcomputer 12051 can perform cooperated control in order to implement functions of an advanced driver assistance system (ADAS) including collision avoidance or collision absorption of a vehicle, following travel based on an inter-vehicle distance, a vehicle speed keeping travel, a vehicle collision warning, or a vehicle lane deviation warning.

Further, the microcomputer 12051 can perform coordinated control for the purpose of automated driving or the like in which autonomous travel is performed without depending on an operation of a driver by controlling the driving force generator, the steering mechanism, the braking device, and the like on the basis of information regarding the vicinity of the vehicle acquired by the vehicle exterior information detection unit 12030 or the vehicle interior information detection unit 12040.

In addition, the microcomputer 12051 can output a control command to the body system control unit 12030 based on the information outside the vehicle acquired by the vehicle exterior information detection unit 12030. For example, the microcomputer 12051 can perform cooperative control for antiglare such as switching a high beam to a low beam by controlling a headlamp according to a position of a preceding vehicle or an oncoming vehicle detected by the vehicle exterior information detection unit 12030.

The audio/image output unit 12052 transmits an output signal of at least one of audio and an image to an output device capable of visually or audibly notifying an occupant of a vehicle or the outside of the vehicle of information. In the example shown in FIG. 30, as such an output device, an audio speaker 12061, a display unit 12062 and an instrument panel 12063 are shown. The display unit 12062 may include, for example, at least one of an onboard display and a head-up display.

Figure 31:
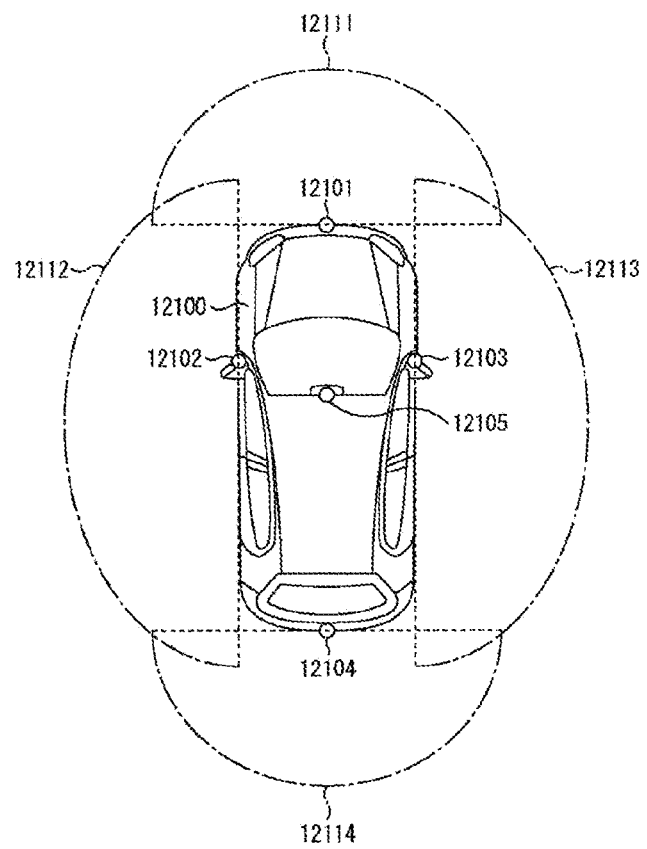
FIG. 31 is an explanatory diagram showing an example of installation positions of a vehicle exterior information detection unit and an imaging unit.

FIG. 31 is a diagram illustrating an example of positions at which the imaging unit 12031 is installed.

In FIG. 31, imaging units 12101, 12102, 12103, 12104, and 12105 are included as the imaging unit 12031.

The imaging units 12101, 12102, 12103, 12104, and 12105 are provided, for example, at positions such as a front nose, side mirrors, a rear bumper, a backdoor, and an upper portion of a front glass of the vehicle interior of the vehicle 12100. The imaging unit 12101 provided in the front nose and the imaging unit 12105 provided in the upper portion of the front glass inside the vehicle mainly acquire images on the front side of the vehicle 12100. The imaging units 12102 and 12103 provided in the side mirrors mainly acquire an image to the side of the vehicle 12100. The imaging unit 12104 provided in the rear bumper or the back door mainly acquires an image to the rear of the vehicle 12100. The imaging unit 12105 included in the upper portion of the front glass inside the vehicle is mainly used to detect front vehicles or pedestrians, obstacles, traffic signals, traffic signs, lanes, and the like.

FIG. 31 shows an example of imaging ranges of the imaging units 12101 to 12104. An imaging range 12111 is an imaging range of the imaging unit 12101 provided on the front nose, imaging ranges 12112 and 12113 are imaging ranges of the imaging units 12102 and 12103 provided in the side mirrors, and an imaging range 12114 is an imaging range of the imaging unit 12104 provided in the rear bumper or the back door. For example, by superimposing image data captured by the imaging units 12101 to 12104, it is possible to obtain a bird's-eye view image viewed from the upper side of the vehicle 12100.

At least one of the imaging units 12101 to 12104 may have a function for obtaining distance information. For example, at least one of the imaging units 12101 to 12104 may be a stereo camera formed by a plurality of image sensors or may be an image sensor that has phase difference detection pixels.

For example, the microcomputer 12051 can extract a three-dimensional object traveling at a predetermined speed (for example, 0 km/h or more) in substantially the same direction as that of the vehicle 12100 which is particularly a closest three-dimensional object on a travel road of the vehicle 12100 as a front vehicle by obtaining a distance from each three-dimensional object within the imaging ranges 12111 to 12114 and a temporal change of the distance (a relative speed to the vehicle 12100) based on the distance information obtained from the imaging units 12101 to 12104. Further, the microcomputer 12051 can set an inter-vehicle distance which is guaranteed in advance before a front vehicle and perform automated brake control (also including following stop control) or automated acceleration control (also including following start control). In this way, it is possible to perform the coordinated control for automated driving or the like in which autonomous travel is performed without an operation of a driver.

For example, the microcomputer 12051 can classify and extract three-dimensional object data regarding three-dimensional objects into two-wheeled vehicles, ordinary vehicles, large vehicles, pedestrians, and other three-dimensional objects such as utility poles on the basis of distance information obtained from the imaging units 12101 to 12104 and use the three-dimensional object data for automatic avoidance of obstacles. For example, the microcomputer 12051 identifies surrounding obstacles of the vehicle 12100 as obstacles which can be viewed by the driver of the vehicle 12100 and obstacles which are difficult to view. Then, the microcomputer 12051 determines a collision risk indicating the degree of risk of collision with each obstacle, and when the collision risk is equal to or higher than the set value and there is a possibility of collision, an alarm is output to the driver through the audio speaker 12061 and the display unit 12062, forced deceleration and avoidance steering are performed through the drive system control unit 12010, and thus it is possible to perform driving support for collision avoidance.

At least one of the imaging units 12101 to 12104 may be an infrared camera that detects infrared light. For example, the microcomputer 12051 can recognize a pedestrian by determining whether there is a pedestrian in the captured image of the imaging units 12101 to 12104. Such pedestrian recognition is performed by, for example, a procedure in which feature points in the captured images of the imaging units 12101 to 12104 as infrared cameras are extracted and a procedure in which pattern matching processing is performed on a series of feature points indicating the outline of the object and it is determined whether the object is a pedestrian. When the microcomputer 12051 determines that there is a pedestrian in the captured images of the imaging units 12101 to 12104, and the pedestrian is recognized, the audio/image output unit 12052 controls the display unit 12062 so that the recognized pedestrian is superimposed and displayed with a square contour line for emphasis. In addition, the audio/image output unit 12052 may control the display unit 12062 so that an icon or the like indicating a pedestrian is displayed at a desired position.

The present technology can also take on the following configurations.

(1) A light receiving element including: A plurality of pixels arranged in a matrix, each of the plurality of pixels including: a photoelectric conversion unit; first and second charge storage units that store charges generated by the photoelectric conversion unit; first and second transfer transistors that transfer the charges from the photoelectric conversion unit to the first and second charge storage units, respectively; first and second amplification transistors that amplify potentials of the first and second charge storage units, respectively; and a connection wiring that electrically connects the first charge storage unit and the first amplification transistor, wherein a first transfer control wiring electrically connected to a gate of the first transfer transistor of each of the pixels in the same row extends in a row direction in a first wiring layer, and the connection wiring extends to the first wiring layer.

(2) The light receiving element according to (1), wherein the connection wiring is adjacent to the first transfer control wiring in the first wiring layer.

(3) The light receiving element according to (1) or (2), wherein the connection wiring extends in parallel with the first transfer control wiring in the first wiring layer.

(4) The light receiving element according to any one of (1) to (3), wherein each of the plurality of pixels further includes a discharge transistor for discharging the charges of the photoelectric conversion unit, and a discharge control wiring electrically connected to a gate of the discharge transistor of each of the pixels in the same row extends in the row direction in the first wiring layer.

(5) The light receiving element according to (4), wherein an intermediate potential is applied to the gate of the discharge transistor while the charges are being stored in the first and second charge storage units.

(6) The light receiving element according to any one of (1) to (5), wherein each of the plurality of pixels further includes a reset transistor for resetting the charges of the first charge storage unit, and a reset control wiring connected to a gate of the reset transistor of each of the pixels in the same row extends in the row direction in the first wiring layer.

(7) The light receiving element according to (6), wherein an intermediate potential is applied to the gate of the reset transistor while the charges are being stored in the first and second charge storage units.

(8) The light receiving element according to any one of (1) to (7), wherein the first transfer control wiring surrounds the connection wiring in the first wiring layer.

(9) The light receiving element according to any one of (1) to (8), wherein the first transfer control wiring extends to a second wiring layer which is an upper layer of the first wiring layer, and the first transfer control wiring in the second wiring layer overlaps the connection wiring in the first wiring layer.

(10) The light receiving element according to (9), wherein the connection wiring in the first wiring layer extends in parallel with the first transfer control wiring in the second wiring layer.

(11) The light receiving element according to (9), wherein the connection wiring in the first wiring layer extends in parallel in a direction orthogonal to the first transfer control wiring in the second wiring layer.

(12) The light receiving element according to any one of (1) to (11), wherein the connection wiring includes: an upper-layer wiring arranged in the first wiring layer; and a lower-layer wiring arranged in the second wiring layer, which is a lower layer of the first wiring layer, and the lower-layer wiring is connected to the upper-layer wiring by an upper-layer via, and is connected to each of the first charge storage unit and the gate of the first amplification transistor by a lower-layer via.

(13) The light receiving element according to any one of (1) to (12), wherein the first transfer control wiring is connected to the gate of the first transfer transistor of a portion of the pixels in the same row, a second transfer control wiring to which a potential having the same phase as that of the first transfer control wiring is applied is connected to the gate of the first transfer transistor of another portion of the pixels in the same row, the first and second transfer control wirings extend in the row direction in the first wiring layer, and the connection wiring is sandwiched between the first and second transfer control wirings in the first wiring layer.

(14) A light receiving element including: a plurality of pixels arranged in a matrix, each of the plurality of pixels including: a photoelectric conversion unit; first and second charge storage units that store charges generated by the photoelectric conversion unit; first and second transfer transistors that transfer the charges from the photoelectric conversion unit to the first and second charge storage units, respectively; first and second amplification transistors that amplify potentials of the first and second charge storage units, respectively; a connection wiring that electrically connects the first charge storage unit and the first amplification transistor; and a discharge transistor that discharges the charges of the photoelectric conversion unit, wherein a discharge control wiring electrically connected to a gate of the discharge transistor of each of the pixels in the same row extends in a row direction in the first wiring layer, and the connection wiring extends to the first wiring layer.

(15) A light receiving element including: a plurality of pixels arranged in a matrix, each of the plurality of pixels including: a photoelectric conversion unit; first and second charge storage units that store charges generated by the photoelectric conversion unit; first and second transfer transistors that transfer the charges from the photoelectric conversion unit to the first and second charge storage units, respectively; first and second amplification transistors that amplify potentials of the first and second charge storage units, respectively; a connection wiring that electrically connects the first charge storage unit and the first amplification transistor; and a reset transistor that resets the charges of the first charge storage unit, wherein a reset control wiring connected to a gate of the reset transistor of each of the pixels in the same row extends in a row direction in the first wiring layer, and the connection wiring extends to the first wiring layer.

(16) A light receiving element including: a plurality of pixels arranged in a matrix, each of the plurality of pixels including: a photoelectric conversion unit; first and second charge storage units that store charges generated by the photoelectric conversion unit; first and second transfer transistors that transfer the charges from the photoelectric conversion unit to the first and second charge storage units, respectively; first and second amplification transistors that amplify potentials of the first and second charge storage units, respectively; a connection wiring that electrically connects the first charge storage unit and the first amplification transistor; and a reset transistor that resets the charges in the first charge storage unit, wherein a boost wiring for boosting the first charge storage unit while the charges are being stored in the first and second charge storage units extends in a row direction in the first wiring layer, and the connection wiring extends to the first wiring layer.

(17) A light receiving element including: a plurality of pixels arranged in a matrix, each of the plurality of pixels including: a photoelectric conversion unit; first and second charge storage units that store charges generated by the photoelectric conversion unit; first and second transfer transistors that transfer the charges from the photoelectric conversion unit to the first and second charge storage units, respectively; first and second amplification transistors that amplify potentials of the first and second charge storage units, respectively; a connection wiring that is arranged in the first wiring layer and electrically connects the first charge storage unit and the first amplification transistor; and a reset transistor that resets the charges in the first charge storage unit, wherein a boost wiring for boosting the first charge storage unit while the charges are being stored in the first and second charge storage units extends in a row direction in a second wiring layer which is an upper layer of the first wiring layer, and the boost wiring extends to the first wiring layer.

(18) A distance measuring device including: a light emitting unit that emits light; a light receiving unit having a plurality of pixels arranged in a matrix to receive reflected light reflected by an object; and a calculation unit that calculates the distance to the object based on the detection signal from the light receiving unit, and each of the plurality of pixels including: a photoelectric conversion unit; first and second charge storage units that store charges generated by the photoelectric conversion unit; first and second transfer transistors that transfer the charges from the photoelectric conversion unit to the first and second charge storage units, respectively; first and second amplification transistors that amplify potentials of the first and second charge storage units, respectively; and a connection wiring that electrically connects the first charge storage unit and the first amplification transistor, wherein a first transfer control wiring electrically connected to a gate of the first transfer transistor of each of the pixels in the same row extends in a row direction in a first wiring layer, and the connection wiring extends to the first wiring layer.

REFERENCE SIGNS LIST

10 Distance measuring device
11 Lens
12 Light receiving unit (light receiving element)
13 Signal processing unit
14 Light emitting unit
15 Light emission control unit
21 Pattern switching unit
22 Distance image generation unit
31 Pixel array unit
32 Vertical drive unit
33 Column processing unit
34 Horizontal drive unit
35 System control unit
36 Pixel drive line
37 Vertical signal line
40a, 40b Pixel
50 Semiconductor substrate
51a, 51b Photodiode
52a, 52b, 53a, 53b Charge storage unit
60a, 60b Discharge transistor
61a, 61b, 62a, 62b Transfer transistor
61x, 61y, 62x, 62y, 63x, 63y, 64x, 64y, 67x, 67y, 68x, 68y Lower-layer via
63a, 63b, 64a, 64b Conversion efficiency adjustment transistor
65a, 65b, 66a, 66b Selection transistor
67a, 67b, 68a, 68b Amplification transistor
69a, 69b, 70a, 70b Reset transistor
71a, 71b, 72a, 72b, 73a, 73b, 74a, 74b Lower-layer wiring
71x, 71y, 72x, 72y, 73x, 73y, 74x, 74y Upper-layer via
81, 81a, 81b, 82, 82a, 82b, 91, 92 Transfer control wiring
83a, 83b, 84a, 84b Upper-layer wiring
85 Reference potential wiring
86 Discharge control wiring
87 Reset control wiring
88 Boost wiring
101, 102, 103 Interlayer insulating film
12000 Vehicle control system
12001 Communication network
12010 Drive system control unit
12020 Body system control unit
12030 Vehicle exterior information detection unit
12030 Body system control unit
12031 Imaging unit
12040 Vehicle interior information detection unit
12041 Driver status detection unit
12050 Integrated control unit
12051 Microcomputer
12052 Audio/image output unit
12061 Audio speaker
12062 Display unit
12063 Instrument panel
12100 Vehicle
12101, 12102, 12103, 12104, 12105 Imaging unit
M1 Lower-layer wiring layer
M2 Upper-layer wiring layer

The invention claimed is:

1. A light receiving element, comprising:
a plurality of pixels arranged in a matrix,
each of the plurality of pixels including:
a photoelectric conversion unit;
first and second charge storage units that store charges generated by the photoelectric conversion unit;
first and second transfer transistors that transfer the charges from the photoelectric conversion unit to the first and second charge storage units, respectively;
first and second amplification transistors that amplify potentials of the first and second charge storage units, respectively; and
a connection wiring that electrically connects the first charge storage unit and the first amplification transistor, wherein
a first transfer control wiring electrically connected to a gate of the first transfer transistor of each of the plurality of pixels in the same row extends in a row direction in a first wiring layer, and
the connection wiring extends to the first wiring layer.

2. The light receiving element according to claim 1, wherein
the connection wiring is adjacent to the first transfer control wiring in the first wiring layer.

3. The light receiving element according to claim 1, wherein
the connection wiring extends in parallel with the first transfer control wiring in the first wiring layer.

4. The light receiving element according to claim 1, wherein
each of the plurality of pixels further includes a discharge transistor for discharging the charges of the photoelectric conversion unit, and
a discharge control wiring electrically connected to a gate of the discharge transistor of each of the plurality of pixels in the same row extends in the row direction in the first wiring layer.

5. The light receiving element according to claim 4, wherein
an intermediate potential is applied to the gate of the discharge transistor while the charges are being stored in the first and second charge storage units.

6. The light receiving element according to claim 1, wherein
each of the plurality of pixels further includes a reset transistor for resetting the charges of the first charge storage unit, and a reset control wiring connected to a gate of the reset transistor of each of the plurality of pixels in the same row extends in the row direction in the first wiring layer.

7. The light receiving element according to claim 6, wherein an intermediate potential is applied to the gate of the reset transistor while the charges are being stored in the first and second charge storage units.

8. The light receiving element according to claim 1, wherein the first transfer control wiring surrounds the connection wiring in the first wiring layer.

9. The light receiving element according to claim 1, wherein
the first transfer control wiring extends to a second wiring layer which is an upper layer of the first wiring layer, and
the first transfer control wiring in the second wiring layer overlaps the connection wiring in the first wiring layer.

10. The light receiving element according to claim 9, wherein the connection wiring in the first wiring layer extends in parallel with the first transfer control wiring in the second wiring layer.

11. The light receiving element according to claim 9, wherein the connection wiring in the first wiring layer extends in parallel in a direction orthogonal to the first transfer control wiring in the second wiring layer.

12. The light receiving element according to claim 1, wherein
the connection wiring includes:
an upper-layer wiring arranged in the first wiring layer; and
a lower-layer wiring arranged in the second wiring layer, which is a lower layer of the first wiring layer, and
the lower-layer wiring is connected to the upper-layer wiring by an upper-layer via, and is connected to each of the first charge storage unit and the gate of the first amplification transistor by a lower-layer via.

13. The light receiving element according to claim 1, wherein
the first transfer control wiring is connected to the gate of the first transfer transistor of a portion of the plurality of pixels in the same row,
a second transfer control wiring to which a potential having the same phase as that of the first transfer control wiring is applied is connected to the gate of the first transfer transistor of another portion of the plurality of pixels in the same row,
the first and second transfer control wirings extend in the row direction in the first wiring layer, and
the connection wiring is sandwiched between the first and second transfer control wirings in the first wiring layer.

14. A light receiving element, comprising:
a plurality of pixels arranged in a matrix,
each of the plurality of pixels including:
a photoelectric conversion unit;
first and second charge storage units that store charges generated by the photoelectric conversion unit;
first and second transfer transistors that transfer the charges from the photoelectric conversion unit to the first and second charge storage units, respectively;
first and second amplification transistors that amplify potentials of the first and second charge storage units, respectively;
a connection wiring that electrically connects the first charge storage unit and the first amplification transistor; and a discharge transistor that discharges the charges of the photoelectric conversion unit, wherein
a discharge control wiring electrically connected to a gate of the discharge transistor of each of the plurality of pixels in the same row extends in a row direction in a first wiring layer, and
the connection wiring extends to the first wiring layer.

15. A light receiving element, comprising:
a plurality of pixels arranged in a matrix,
each of the plurality of pixels including:
a photoelectric conversion unit;
first and second charge storage units that store charges generated by the photoelectric conversion unit;
first and second transfer transistors that transfer the charges from the photoelectric conversion unit to the first and second charge storage units, respectively;
first and second amplification transistors that amplify potentials of the first and second charge storage units, respectively;
a connection wiring that electrically connects the first charge storage unit and the first amplification transistor; and
a reset transistor that resets the charges of the first charge storage unit, wherein
a reset control wiring connected to a gate of the reset transistor of each of the plurality of pixels in the same row extends in a row direction in a first wiring layer, and
the connection wiring extends to the first wiring layer.

16. A light receiving element, comprising:
a plurality of pixels arranged in a matrix,
each of the plurality of pixels including:
a photoelectric conversion unit;
first and second charge storage units that store charges generated by the photoelectric conversion unit;
first and second transfer transistors that transfer the charges from the photoelectric conversion unit to the first and second charge storage units, respectively;
first and second amplification transistors that amplify potentials of the first and second charge storage units, respectively;
a connection wiring that electrically connects the first charge storage unit and the first amplification transistor; and
a reset transistor that resets the charges in the first charge storage unit, wherein a boost wiring for boosting the first charge storage unit while the charges are being stored in the first and second charge storage units extends in a row direction in a first wiring layer, and
the connection wiring extends to the first wiring layer.

17. A light receiving element, comprising:
a plurality of pixels arranged in a matrix,
each of the plurality of pixels including:
a photoelectric conversion unit;
first and second charge storage units that store charges generated by the photoelectric conversion unit;
first and second transfer transistors that transfer the charges from the photoelectric conversion unit to the first and second charge storage units, respectively;
first and second amplification transistors that amplify potentials of the first and second charge storage units, respectively;
a connection wiring that is arranged in a first wiring layer and electrically connects the first charge storage unit and the first amplification transistor; and
a reset transistor that resets the charges in the first charge storage unit, wherein a boost wiring for boosting the first charge storage unit while the charges are being stored in the first and second charge storage units extends in a row direction in a second wiring layer which is an upper layer of the first wiring layer, and
the boost wiring extends to the first wiring layer.

18. A distance measuring device, comprising:

a light emitting unit that emits light;

a light receiving unit having a plurality of pixels arranged in a matrix to receive reflected light reflected by an object; and a calculation unit that calculates the distance to the object based on the detection signal from the light receiving unit, and each of the plurality of pixels including:

a photoelectric conversion unit;

first and second charge storage units that store charges generated by the photoelectric conversion unit;

first and second transfer transistors that transfer the charges from the photoelectric conversion unit to the first and second charge storage units, respectively;

first and second amplification transistors that amplify potentials of the first and second charge storage units, respectively; and a connection wiring that electrically connects the first charge storage unit and the first amplification transistor, wherein a first transfer control wiring electrically connected to a gate of the first transfer transistor of each of the plurality of pixels in the same row extends in a row direction in a first wiring layer, and the connection wiring extends to the first wiring layer.

* * * * *